US010717051B2

(12) United States Patent
Datta et al.

(10) Patent No.: US 10,717,051 B2
(45) Date of Patent: Jul. 21, 2020

(54) CARBON NANOTUBE MEMBRANE SYSTEMS AND METHODS OF SYNTHESIS

(71) Applicant: ARIZONA BOARD OF REGENTS ON BEHALF OF ARIZONA STATE UNIVERSITY, Scottsdale, AZ (US)

(72) Inventors: Siddhant Datta, Tempe, AZ (US); Aditi Chattopadhyay, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 699 days.

(21) Appl. No.: 15/154,754

(22) Filed: May 13, 2016

(65) Prior Publication Data
US 2016/0332121 A1    Nov. 17, 2016

Related U.S. Application Data

(60) Provisional application No. 62/161,150, filed on May 13, 2015.

(51) Int. Cl.
*B01D 67/00* (2006.01)
*B01D 71/02* (2006.01)
*B82B 1/00* (2006.01)

(52) U.S. Cl.
CPC ....... *B01D 67/0046* (2013.01); *B01D 71/021* (2013.01); *B82B 1/00* (2013.01)

(58) Field of Classification Search
CPC .................................................. B01D 67/0046
See application file for complete search history.

(56) References Cited

U.S. PATENT DOCUMENTS

| | | | |
|---|---|---|---|
| 7,459,121 B2 | 12/2008 | Liang et al. | |
| 7,931,838 B2 | 4/2011 | Marand et al. | |
| 8,351,220 B2 | 1/2013 | Liang et al. | |
| 8,916,651 B2 | 12/2014 | Cheng et al. | |
| 2008/0128659 A1 | 6/2008 | Parker et al. | |

(Continued)

FOREIGN PATENT DOCUMENTS

| | | |
|---|---|---|
| WO | 2014/151105 A1 | 9/2014 |
| WO | 2016/100622 A1 | 6/2016 |

OTHER PUBLICATIONS

E.T. Thostenson et al., "Advances in the science and technology of carbon nanotubes and their composites: a review", Composites Science and Technology, 61, pp. 1899-1912 (2001).

(Continued)

*Primary Examiner* — Larry W Thrower
(74) *Attorney, Agent, or Firm* — Michael Best & Friedrich LLP

(57) ABSTRACT

Some embodiments include a method of preparing a membrane by dispersing carbon nanotubes in a solvent, and preparing a slurry from the dispersion by removing at least a portion of the solvent. The method includes applying the slurry to a first surface, and forming a carbon nanotube membrane by compressing the slurry between the first surface and at least a second surface. Some embodiments forming a composite assembly by sandwiching the carbon nanotube membrane between two or more bleeder cloth layers to form an uncured assembly, and applying a curable resin to a first side of the uncured assembly, and applying a curable resin to a second side of the uncured assembly, and curing the uncured assembly.

17 Claims, 16 Drawing Sheets

(56) References Cited

U.S. PATENT DOCUMENTS

| | | |
|---|---|---|
| 2008/0170982 A1 | 7/2008 | Zhang et al. |
| 2009/0148637 A1 | 6/2009 | Zhang et al. |
| 2012/0298927 A1 | 11/2012 | Hoa et al. |
| 2013/0130049 A1 | 5/2013 | Moilanen et al. |
| 2014/0209539 A1 | 7/2014 | El Badawi et al. |

OTHER PUBLICATIONS

K. Chen et al., "Mechanical and thermal properties of epoxy nanocomposites reinforced with amino-functionalized multi-walled carbon nanotubes", Materials Science and Engineering A, 492, pp. 236-242(2008).

Q. Cheng et al., "High Mechanical Performance Composite Conductor: Multi-Walled Carbon Nanotube Sheet/Bismaleimide Nanocomposites", Adv. Funct. Mater., 19, pp. 3219-3225 (2009).

B. Ashrafi et al., "Correlation between Young's modulus and impregnation quality of epoxy-impregnated SWCNT buckypaper", Composites: Part A, 41, pp. 1184-1191 (2010).

L.F. Dumée et al., "Characterization and evaluation of carbon nanotube Bucky-Paper membranes for direct contact membrane distillation", Journal of Membrane Science, 351, pp. 36-43 (2010).

P. Slobodian et al., "Multi-wall carbon nanotube networks as potential resistive gas sensors for organic vapor detection", Carbon, 49, pp. 2499-2507 (2011).

R. Benlikaya et al., "Enhanced Strain-Dependent Electrical Resistance of Polyurethane Composites with Embedded Oxidized Multiwalled Carbon Nanotube Networks", Journal of Nanomaterials, vol. 2013, Article ID 327597 (2013).

I. Kang et al., "A carbon nanotube strain sensor for structural health monitoring", Smart Mater. Struct., 15, pp. 737-748 :2006).

C. Zheng et al., "Ionic liquid coated single-walled carbon nanotube buckypaper as supercapacitor electrode", Particuology, 11, pp. 409-414 (2013).

W. Zhu et al., "Bucicypaper-based catalytic electrodes for improving platinum utilization and PEMFC's performance", Electrochimica Acta, 55, pp. 2555-2560 (2010).

X. Fu et al., "Carbon nanotube buckypaper to improve fire retardancy of high-temperature/high-performance polymer composites", Nanotechnology, 21, 235701 (2010).

J.G. Park et al., "Electromagnetic interference shielding properties of carbon nanotube buckypaper composites", Nanotechnology, 20, 415702 (2009).

H. Chu et al. "Self-heating fiber reinforced polymer composite using meso/macropore carbon nanotube paper and its in application in deicing", Carbon, 66, pp. 154-163 (2014).

M.D. Rein et al., "Sensors and sensitivity: Carbon nanotube buckypaper films as strain sensing devices", Composites Science and Technology, 71, pp. 373-381 (2011).

P. Dharap et al., "Nanotube film based on single-wall carbon nanotubes for strain sensing", Nanotechnology, 15, pp. 379-382 (2004).

C.-S. Yeh, "A Study of Nanostructure and Properties of Mixed Nanotube Buckypaper Materials: Fabrication, Process Modeling Characterization, and Property Modeling", PhD Thesis, Florida State University (2007).

M.F. Islam, "High Weight Fraction Surfactant Solubilization of Single-Wall Carbon Nanotubes in Water", Nano Letters, 3(2), pp. 269-273 (2003).

C.-Y. Lin, "Investigation and Characterization of SWNT Buckypaper Manufacturing Process", MSc Thesis, Florida State University (2005).

Q. Liu et al., "Improvement on the tensile performance of buckypaper using a novel dispersant and functionalized carbon nanotubes", Composites: Part A, 55, pp. 102-109 (2013).

D. Tasis et al., "Soluble Carbon Nanotubes", Chem. Eur. J., 9, pp. 4000-4008 (2003).

K. Sears et al., "Recent Developments in Carbon Nanotube Membranes for Water Purification and Gas Separation", Materials, 3, pp. 127-149 (2010).

X. Zhang et al., "Hydroentangling: A Novel Approach to High-Speed Fabrication of Carbon Nanotube Membranes", Adv. Mater., 20, pp. 4140-4144 (2008).

J. Zhang et al., "Influence of geometries of multi-walled carbon nanotubes on the pore structures of Buckypaper", Composites: Part A, 43, pp. 469-474 (2012).

S.M. Cooper et al., "Gas Permeability of a Buckypaper Membrane", Nano Letters, vol. 3, No. 2, pp. 189-192 (2003).

R.L.D. Whitby, "Geometric control and tuneable pore size distribution of buckypaper and buckydiscs", Carbon, 46, pp. 949-956 (2008).

A.I. Oliva-Aviles, "Electrical and piezoresistive properties of multi-walled carbon nanotube/polymer composite films aligned by an electric field", Carbon, 49, pp. 2989-2997 (2011).

J.R. Bautista-Quijano, "Strain sensing capabilities of a piezoresistive MWCNT-polysulfone film", Sensors and Actuators A, 159, pp. 135-140 (2010).

S. Iijima, "Helical microtubes of graphitic carbon", Letters to Nature, vol. 354, pp. 56-58 (1991).

U. Vohrer et al., "Carbon nanotube sheets for the use as artificial muscles", Carbon, 42, pp. 1159-1164 (2004).

S. Ounnunkad et al., "Comparison of the electrochemical behaviour of buckypaper and polymer-intercalated buckypaper electrodes", Journal of Electroanalytical Chemistry, 652, pp. 52-59 (2011).

A.M. Diez-Pascual et al., "Poly(phenylene sulphide) and poly(ether ether ketone) composites reinforced with single-walled carbon nanotube buckypaper: II—Mechanical properties, electrical and thermal conductivity", Composites: Part A, 43, pp. 1007-1015 (2012).

P.E. Lopes et al., "High CNT content composites with CNT Buckypaper and epoxy resin matrix: Impregnation behaviour composite production and characterization", Composite Structures, 92, pp. 1291-1298 (2010).

G.T. Pham et al., "Mechanical and electrical properties of polycarbonate nanotube buckypaper composite sheets", Nanotechnology, 19, 325705 (2008).

C. Meng et al., "Flexible carbon nanotube/polyaniline paper-like films and their enhanced electrochemical properties", Electrochemistry Communications, 11, pp. 186-189 (2009).

M.Y. Fard et al., "Analytical Solution for Flexural Response of Epoxy Resin Materials", Journal of Aeropsace Engineering, 25(3), pp. 395-408 (2012).

M.Y. Fard et al., "Characterization of Epoxy Resin Including Strain Rate Effects Using Digital Image Correlation System", Journal of Aeropsace Engineering, 25(2), pp. 308-319 (2012).

M.Y. Fard et al., "The ratio of flexural strength to uniaxial tensile strength in bulk epoxy resin polymeric materials", Polymer Testing, 40, pp. 156-162 (2014).

M.Y. Fard et al., "Damage characterization of surface and subsurface defects in stitch-bonded biaxial carbon/epoxy composites", Composites: Part B, 56, pp. 821-829 (2014).

Z. Wang et al., "Processing and property investigation of single-walled carbon nanotube (SWNT) buckypaper/epoxy resin matrix nanocomposites",Composites: Part A, 35, pp. 1225-1232 (2004).

L.H. Manjunatha et al., "Fabrication and Properties of dispersed carbon nanotube—AI6061 composites", International Journal of Innovative Research in Science, Engineering and Technology, vol. 2, Issue 2, pp. 500-507 (2013).

Q.Y. Jiang, "Mixed-Conducting Oxygen Permeable Ceramic Membrane and its Application in the Production of Synthesis Gas", PhD Thesis, University of Kansas (2010).

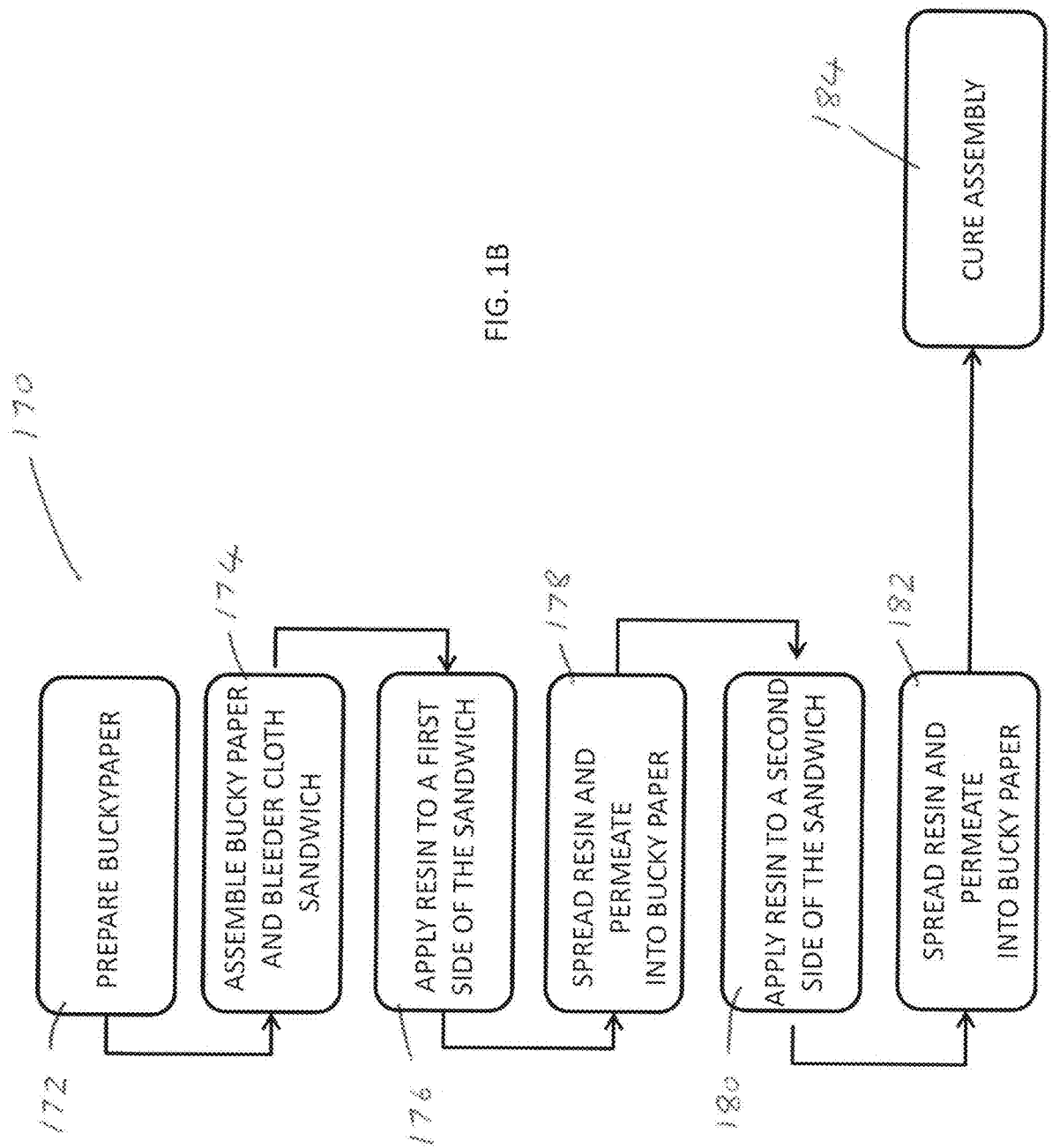

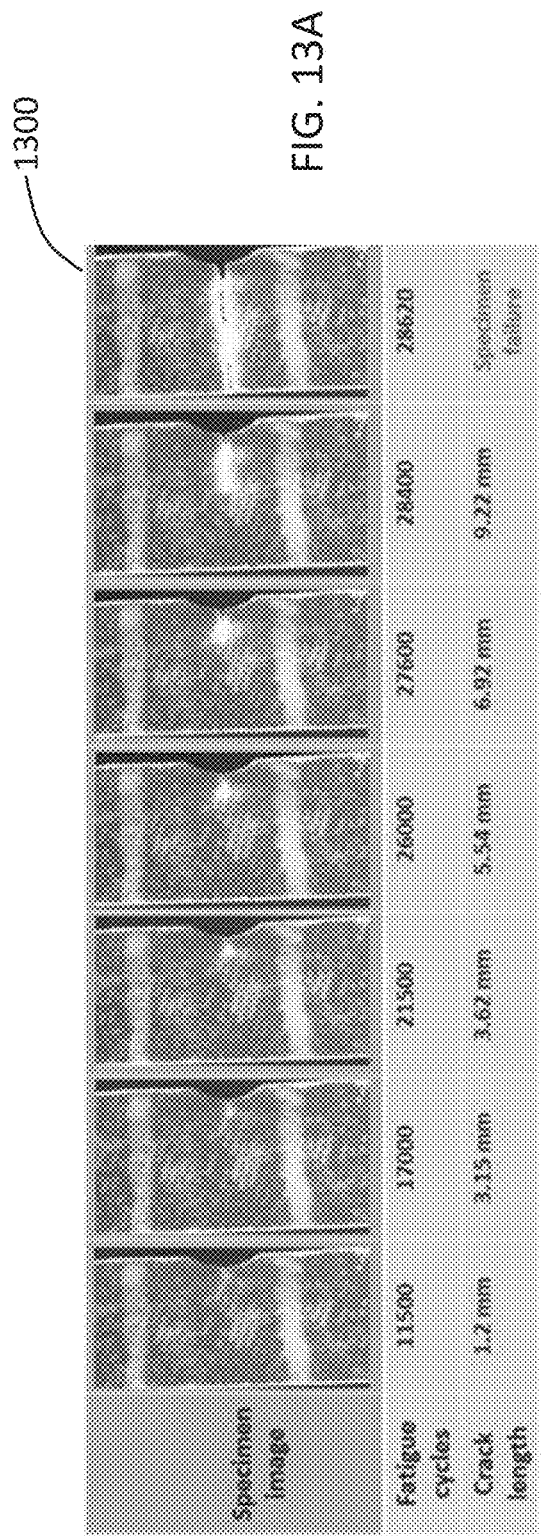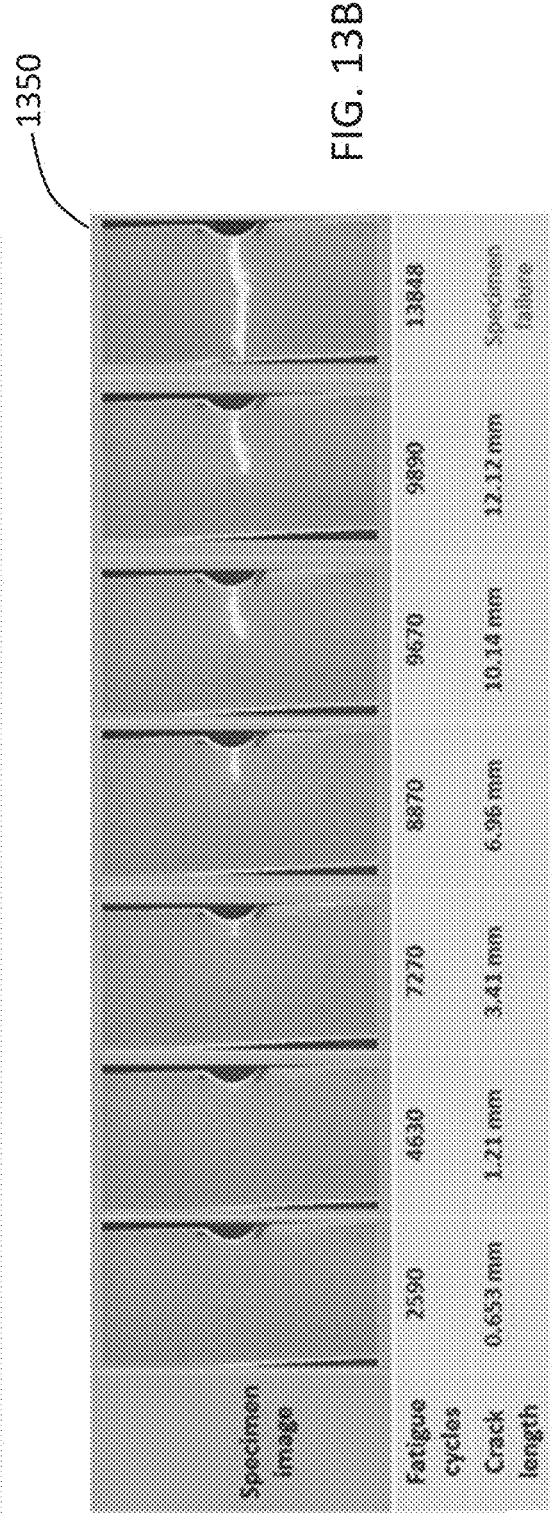

CARBON NANOTUBE MEMBRANE SYSTEMS AND METHODS OF SYNTHESIS

CROSS-REFERENCE TO RELATED APPLICATIONS

This application claims priority to U.S. provisional application Ser. No. 62/161,150, filed on May 13, 2015, the entire contents of which are incorporated herein by reference.

STATEMENT REGARDING FEDERALLY SPONSORED RESEARCH OR DEVELOPMENT

Some research conducted for conception and development of at least one embodiment of the invention described herein was made using Federal awarded by the Office of Naval Research under Grant No. N00014-14-1-0068. The U.S. Federal Government has certain rights in the invention.

BACKGROUND

Since the discovery of carbon nanotubes ("CNTs") by Sumio Iijima in 1991, CNTs have gained immense popularity in the field of nanocomposites by exhibiting an unprecedented combination of beneficial mechanical, thermal and electrical properties. The use of CNTs as nanofillers in polymer composites has demonstrated the potential for improvements in mechanical properties such as tensile and compressive strength, elastic modulus and fatigue resistance, in addition to enhanced thermal and electrical properties. More recently, polymer/CNT nanocomposites have received extensive recognition for the versatility they offer in a variety of applications such as water purification, gas sensing, strain sensing, super capacitance, fuel cell electrodes, fire retardant coatings, artificial muscles, EMI shielding and self-heating hybrid composites for de-icing. These applications employ CNTs in the form of a thin porous membrane of highly entangled CNTs held together by van der Waals forces, sometimes referred to as "buckypaper".

The current fabrication methods for CNT membranes are often complex, require long processing times, and impose significant size limitations on the membrane. As a result, the applications of carbon nanotube ("CNT") membranes are still in their infancy, and prototype feasibility is often limited to laboratory scale demonstrations. A more rapid, large-scale manufacturing technique is critical to extend the application of these multifunctional capabilities to the industrial scale.

Vacuum filtration is currently used used by many researchers for manufacturing CNT membranes. This method involves vacuum assisted filtration of a homogeneously dispersed CNT solution using a Polytetrafluoroethylene (PTFE) or nylon filter with sub-micron sized pores. CNTs are deposited on the filter surface and form a thin CNT membrane (hereinafter referred to as "CNT membrane"). The CNT membrane can be lifted from the filter surface after drying and used for applications such as water purification (see for example Dumée L. F, Sears K., Schütz J., Finn N., Huynh C., Hawkins S., Duke M., Gray S 2010, "Characterization and evaluation of carbon nanotube bucky-Paper membranes for direct contact membrane distillation", Journal of Membrane Science 351, 36-43.) This technique has been used for manufacturing CNT membranes as an embedded strain sensor in epoxy dog-bone specimens (see for example Rein M D, Breuer O., and Wagner H D 2011, "Sensors and sensitivity: carbon nanotube buckypaper films as strain sensing devices", Composites Science and Technology, 71, 373-381), and as a smart skin for strain sensing in aircraft wings (see for example Dharap P., Li Z., Nagarajaiah S., and Barrera E V 2004, "Nanotube film based on single-wall carbon nanotubes for strain sensing", Nanotechnology, 15, 379-382), and as a de-icing glass fiber reinforced polymer ("GFRP") nanocomposites (see for example Chu H, Zhang Z., Liu Y., and Leng J 2014, "Self-heating fiber reinforced polymer composite using meso/macropore carbon nanotube paper and its application in deicing", Carbon 66, 154-163.)

The use of vacuum filtration methods tends to limit the size of the manufactured CNT membranes to the diameter of the filter being used, and can also lead to heterogeneous distribution of CNT bundles in the finished product (see for example Cherng-Shii Y., "Characterization of nanotube buckypaper manufacturing process", 2004. Electronic Theses, Treatises and Dissertations. Paper 420.) Further, the use of filters with larger diameters may not be practically feasible because of the large volume of CNT solution that would need to be filtered. Moreover, maintaining homogeneous dispersion in a large volume of CNT solution is a challenging task due to the tendency of CNTs to form agglomerates/clusters. Filtering larger quantities of solution through sub-micron filters can take several hours depending on the diameter and pore size of the filter, the volume of solution being filtered, and the pressure difference applied by a vacuum pump.

Current CNT membrane fabrication methods typically require the use of surfactants, organic binders, and/or chemical functionalization of the CNTs to assist in obtaining a stable uniform dispersion during filtration, any one of which can affect the properties of the CNTs in the final product. For example, following filtration, the surfactants can be difficult to remove from the CNT membrane, and can hamper the efficiency of the membrane for applications such as water purification, gas separation and bio fuel cell electrodes. Chemical modification of CNTs prior to the filtration can also degrade the functionality of CNT membranes for the aforementioned applications. Other less commonly used fabrication methods for CNT membranes include hydroentanglement, which involves impregnation of high speed water jets onto CNTs present on a porous substrate, where the high pressure of water jets induces entanglement of the CNTs in the membrane (see for example Zhang X 2008, "Hydroentangling: A novel approach to high-speed fabrication of carbon nanotube membranes", Adv. Mater. 20, 4140-4144). Not only is this method complex to set up, the use of high speed water jets demands a high power consumption, and thus is limited to the production of smaller size membranes.

Accordingly, there exists a need for fabrication methods for CNTs membranes that enable the formation of larger CNT membranes with production scale efficiency and speed, while reducing or substantially eliminating chemical and physical degradation of the CNTs.

SUMMARY OF THE INVENTION

Some embodiments of the invention include a membrane forming method comprising preparing a dispersion of at least one solvent and a plurality of carbon nanotubes, preparing a slurry from at least a portion of the dispersion by removing at least a portion of the at least one solvent, and applying at least a portion of the slurry to a first surface. Further, the method includes forming a carbon nanotube membrane by compressing at least a portion of the slurry between the first surface and at least a second surface.

In some embodiments, the at least one solvent comprises at least one alcohol. In some further embodiments, the at least one alcohol includes methanol, ethanol, and/or isopropyl alcohol. In some embodiments, the at least one solvent comprises acetone. In some embodiments of the invention, the at least one solvent is removed thermally. In other embodiments, the at least one solvent is removed through agitation. In some embodiments, the at least one solvent is removed using sonication. In some further embodiments, the sonication is induced using a tip-sonicator. In some embodiments, the tip-sonicator operates at a frequency of about 20 KHz. In other embodiments, the tip-sonicator operates at a power level of about 15 Watts.

In some embodiments of the invention, the carbon nanotube membrane is mechanically self-supporting upon removal from at least one of the first surface and the second surface. In some embodiments, the first surface and the second surface are pressed together at a rate of about 0.2 mm/s. In some further embodiments, the plurality of carbon nanotubes include at least one of single-wall carbon nanotubes and multi-wall carbon nanotubes.

Some embodiments include a composite assembly method comprising forming a membrane using a method comprising preparing a dispersion of at least one solvent and a plurality of carbon nanotubes, and preparing a slurry from at least a portion of the dispersion by removing at least a portion of the at least one solvent. The method comprises applying at least a portion of the slurry to a first surface, and forming a carbon nanotube membrane by compressing at least a portion of the slurry between the first surface and at least a second surface. Further, the composite assembly method comprises sandwiching the carbon nanotube membrane between two or more bleeder cloth layers to form an uncured assembly, applying a curable resin to a first side of the uncured assembly, applying a curable resin to a second side of the uncured assembly, and curing the uncured assembly.

In some embodiments of the composite assembly method, the at least one solvent is removed thermally. In some further embodiments of the composite assembly method, the at least one solvent is removed by sonication. In some further embodiments of the composite assembly method, the sonication is induced using a tip-sonicator. In some further embodiments of the composite assembly method, the carbon nanotube membrane is at least partially dried prior to forming the uncured assembly.

In some embodiments, the curable resin at least partially permeates at least a portion of the carbon nanotube membrane. Some embodiments include a curable resin that comprises an epoxy-based monomer.

DESCRIPTION OF THE DRAWINGS

FIG. 1B shows a flowchart illustrating a CNT-based nanocomposite assembly in accordance with some embodiments of the invention.

FIG. 13A illustrates fatigue crack propagation in silver electrode glass fiber epoxy laminates specimen in accordance with some embodiments of the invention.

FIG. 13B illustrates fatigue crack propagation in a baseline glass fiber epoxy laminate specimen in accordance with some embodiments of the invention.

DETAILED DESCRIPTION

Figure 1A:
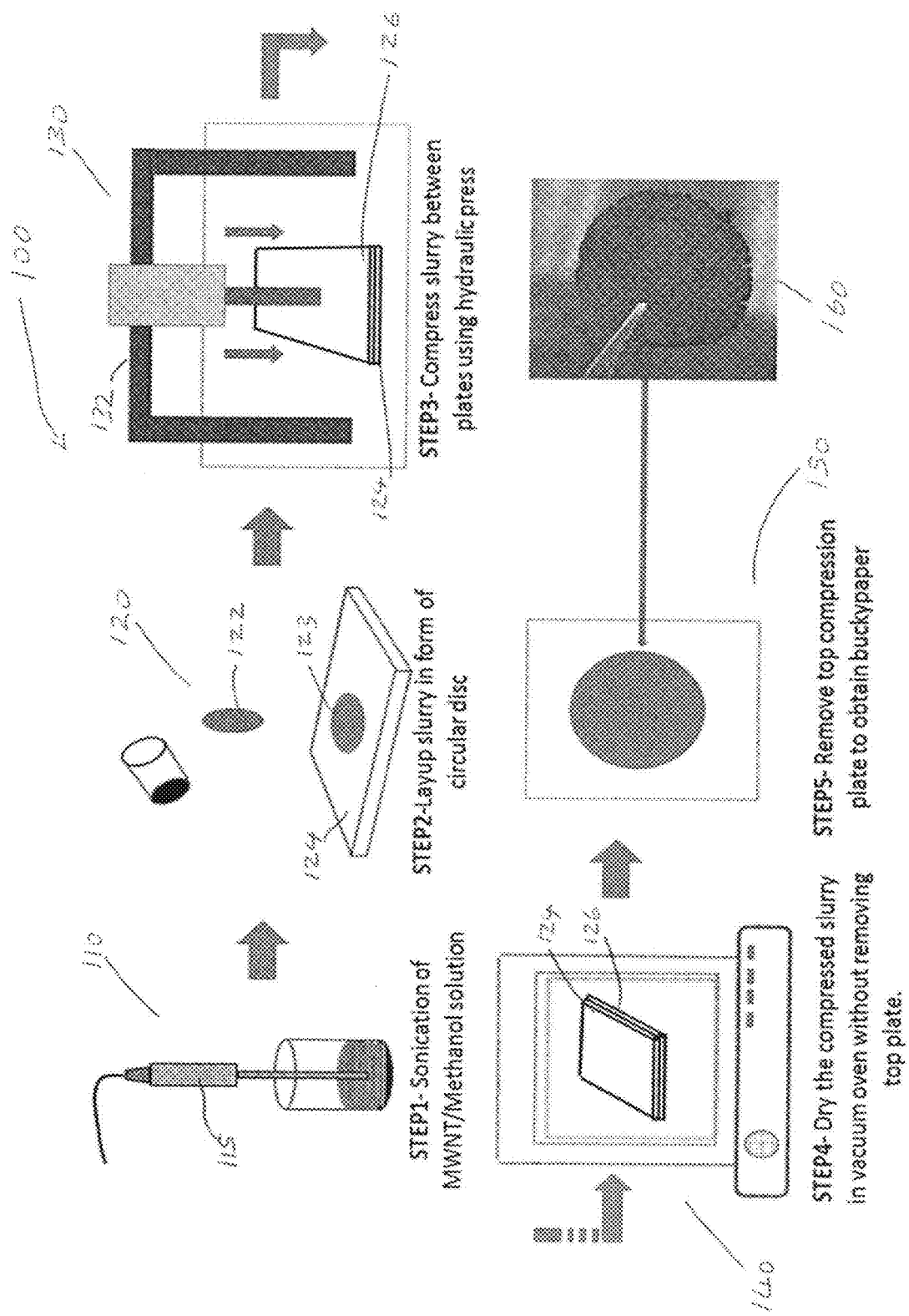
FIG. 1A illustrates a schematic of a CNT membrane manufacturing process in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention include CNT membrane materials and methods of fabricating CNT membrane materials. In some embodiments, the fabrication method can enable the production of CNT membrane materials of greater size (e.g., diameter) than is possible with conventional manufacturing techniques. In some embodiments, the fabrication method can enable the production of membranes with a controlled thicknesses ranging from about 150 µm to about 1.3 mm. The fabrication method does not require the use of surfactant assisted dispersion, chemical functionalization, or the use of any filtration technique. Therefore, processing time can be reduced by about six to eight times depending upon the size of the CNT membrane. Unlike conventional techniques, where some fraction of the CNTs passes through the filtration membrane, there is no loss of CNTs in the proposed method. This technique provides the potential to advance CNT membranes from laboratory scale demonstrations to industrial scale applications since there is no size limitation for the CNT membrane. Some further embodiments of the invention include compositions, methods of fabrication, and methods of use of embedded or mounted CNT membranes as strain sensors for glass fiber epoxy composites.

In some embodiments, CNT membranes can be formed using multi-wall carbon nanotubes (hereinafter "MWNT's). In some further embodiments, the CNT membranes can be formed using single-wall carbon nanotubes (hereinafter "SWNT's). In some other embodiments, the CNT membranes can be formed using mixtures of SWNT's and MWNT's. MWNT materials used in this research were obtained from US Research Nanomaterials Inc. produced using chemical vapor deposition. In some embodiments, the average outer diameter of the CNTs can be about 10 nm to about 30 nm with an average length of about 15 µm to about 30 µm. In some embodiments, the purity of the MWNTs can be about 90%. Other embodiments can include MWNT's with purities greater than or less than 90% In other embodiments of the invention, CNTs with sizes different than those described above can be used. For example, in some embodiments, the CNTs can comprise an average outer diameter less than about 10 nm, or as described above, SWNT's can be used instead of MWNTs depending upon the application for which the CNT membrane is manufactured for.

FIG. 1A illustrates a schematic of a CNT membrane manufacturing process 100 in accordance with some embodiments of the invention. In some embodiments, a step 110 of the CNT membrane manufacturing process can comprise preparation of a solution of MWNT's in a solvent. In some embodiments, MWNT's can be dispersed into at least one solvent using stirring, ultrasonic mixing, or any other convention mixing technique. In some embodiments, the solvent can comprise an alcohol such as methanol or ethanol. In some other embodiments, other solvents can be used including acetone, and isopropanol, and mixtures thereof.

In some embodiments, the MWNT/solvent mixture formed in step 110 of the CNT membrane manufacturing process 100 can comprise a concentration of about 25 mg/ml. In other embodiments of the invention, more or less concentrated solutions can be prepared. For example, in some embodiments, the MWNT/solvent mixture can comprise a concentration greater than about 25 mg/ml, and in some other embodiments, the MWNT/solvent mixture can comprise a concentration less than about 25 mg/ml. In some embodiments, a volume of about 15 ml of the MWNT/solvent mixture formed in step 110 can be used to fabricate a CNT membrane that comprises a diameter of about 4.4 cm in with an average thickness of about 200 µm.

In some embodiments of the invention, the MWNT/solvent mixture can be ultrasonically agitated with a tip-sonicator 115. In some embodiments, this can lead to evaporation of at least some portion of the solvent (e.g., methanol), that can eventually result in the formation of a highly viscous slurry of MWNTs and solvent (e.g., such as methanol.) The use of a tip-sonicator to vaporize solvent can enable controlled evaporation of solvent, and can be a significant factor in achieving homogeneous slurry with the desired concentration of solvent. In some embodiments, the tip-sonicator can produce ultra-sonic waves that can reduce the MWNT/solvent mixture to a slurry form by vaporizing the solvent. Volatile solvents such as methanol and ethanol are suitable for this purpose since they can be vaporized instantly in small pocket around the tip of the sonicator 115. In some embodiments, the sonication frequency of the tip-sonicator 115 can be about 20 KHz, with a power level of about 15 Watts. In some further embodiments, the sonication frequency can be less than about 20 KHz or more than about 20 KHz. Further, in some embodiments, the power level can be less than or greater than about 15 Watts. The choice of solvent can be crucial since the solvent's evaporation rate due to sonication governs the wetness of slurry, and in turn the processing time and quality of finished product (i.e., the CNT membrane). In some embodiments, the tip-sonicator 115 can produce a mist of solvent (the mist evaporates since the solvent is volatile) as it comes in contact with the MWNT/solvent mixture, leaving behind a wet slurry. In some embodiments, the wet slurry can be manipulated to form a continuous layer which can be compressed between two surfaces (e.g., between two or more steel plates.) In some embodiments of the invention, the tip-sonicator 115 can be used to target any free flowing solvent present in the slurry to obtain the desired wetness in the slurry. Further, in some embodiments, CNT's can sometimes exist in aggregates through entanglement in the form of bundles. In some embodiments, these aggregates can be disintegrated into finer bundles using the tip-sonicator 115 resulting in homogenous slurry that can be used to produce quality membranes with fewer defects.

In some embodiments of the invention, the slurry can be stirred with a glass rod or other conventional tool to improve homogeneity, and then laid up for compression between two generally flat surfaces (e.g., such as steel plates.) For example, in a second step 120 of the CNT membrane manufacturing process, the slurry 122 can be deposited (e.g., poured or otherwise dispensed) on a first steel plate 124, and a second steel plate 126 (shown in step 130) can be placed against the first steel plate 124. In some embodiments, one or more of the steel plates 124,126 can be covered with plastic sheets to prevent adhesion between the CNT membrane and the plates. In a third step 130 of the CNT membrane manufacturing process, a hydraulic press 132 (e.g., such as a 20 ton press) can be used to compress the slurry into a thin membrane between the plates 124,126. In some embodiments, to produce a CNT membrane of about 4.4 cm diameter, the slurry can be laid down in a generally circular disc shape with a diameter of about 2.5 cm and a thickness of about 3 mm (depicted as slurry 123 in step 120).

In some embodiments of the invention, the compression of the MWNT/solvent slurry can be performed at a rate that can prevent or reduce the quantity of solvent ejected from the MWNT/solvent slurry. In some embodiments, rapid ejection of solvent can create undesirable cracks in the CNT membrane. For example, in some embodiments, the pressing can be performed at an actuation rate of about 0.2 mm/s, with a pressing process time of about two minutes to complete for pressing a layer of slurry that is approximately 24 mm in height, and with pressing halted when the hydraulic press reaches full load (e.g., 20 Tons). In some further embodiments, the press actuation rate can be more or less than about 0.2 mm/s. In some further embodiments, the load applied on the slurry during compression can be more than or less than 20 Tons, which in some embodiments can enable the formation of a desired thickness of the CNT membrane. Turning now to the fourth step 140 depicted in FIG. 1A, in some embodiments of the invention, the two plates 124, 126 sandwiching the membrane can be removed from the press and placed into an oven at about 60° C. for about 1 hour. Moving to a fifth step 150, in some embodiments, after drying, plates 124, 126 can be separated, and a free-standing MWNT CNT membrane (shown as membrane 160) can be degassed for about 12 hours.

Some further embodiments of the invention include compositions and methods of fabrication, and methods of use of CNT membrane-based nanocomposites. Some embodiments can include fabrication of CNT membrane/epoxy nanocomposites. In some embodiments, PRI2002-3-R-A and hardener PRI2000-5-HR-B, obtained from Pipe Reconstruction Inc., with a 100/22 weight ratio can be used in the fabrication of nanocomposites films.

FIG. 1B shows a flowchart 170 illustrating a CNT-based nanocomposite assembly in accordance with some embodiments of the invention. In some embodiments, a first step 172 can comprise preparation of a CNT membrane (e.g., as described earlier and shown in FIG. 1A). In some further embodiments, for the fabrication of CNT membrane/epoxy nanocomposite films including MWNT content, a CNT membrane can be sandwiched between a porous structure such as two pieces of bleeder cloth (step 174), and resin can be applied to the bleeder cloth surface (step 176). In one non-limiting example embodiment, the resin can be spread over the bleeder cloth surface using a conventional hand layup tool. In other embodiments, the resin can be spread over the bleeder cloth surface using any conventional tool or method (process 178). In some embodiments, this layup technique can force the resin through various pores in the bleeder cloth (process 178), allowing it to permeate into the CNT membrane (through various pores in the membrane). In some embodiments, both sides of the CNT membrane can be impregnated using this layup method (process 180, and resin spreading process 182). In some embodiments, specimens of the resin coated CNT membrane can be cured (step 184). In some embodiments, the specimens can be cured for about 12 hours at about 65° C. In some embodiments, using the method shown in FIG. 1B, CNT membrane/epoxy films with a MWNT content of about 26 wt % to about 30 wt % can be obtained.

The quality of resin impregnation in CNT membrane/epoxy nanocomposites was determined by cross-sectional examination using SEM. Randomly dispersed CNT and pristine specimens were also fabricated for comparison of mechanical properties. A concentration of about 1 wt % randomly dispersed MWNT/epoxy was fabricated by first sonicating MWNTs in epoxy using the tip-sonicator 115 for about 1 hour and stopping at intervals of about 10 minutes for manually stirring the mixture with glass rod. The mixture of randomly dispersed MWNTs and epoxy was cast into films by solution casting. Tensile tests on the films were conducted using a desktop Test Resources load frame at a displacement rate of about 0.0063 mm/s. The strain response of the films under tension was analyzed using a DIC system.

Figure 2B:
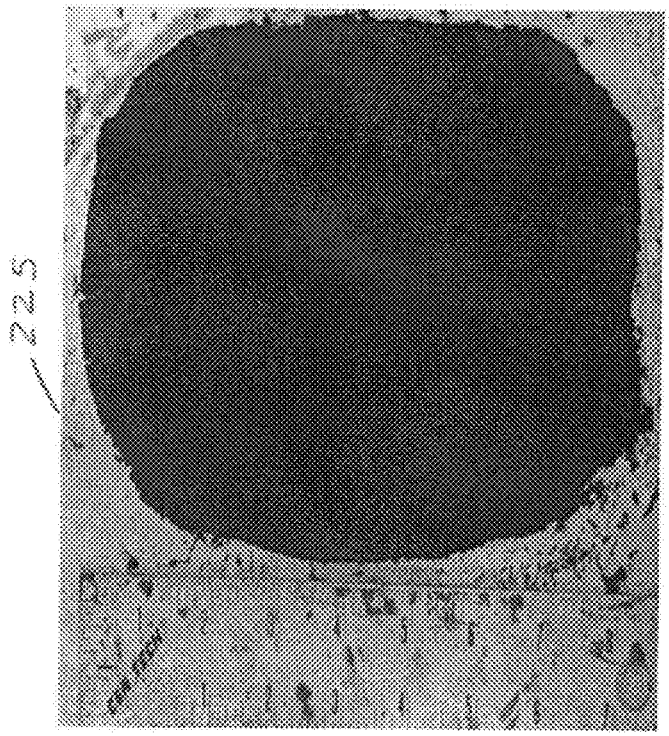
FIG. 2B illustrates a 20 cm×16 cm CNT membrane manufactured by scaling up quantity of methanol/MWNT slurry in accordance with some embodiments of the invention.
Figure 2A:
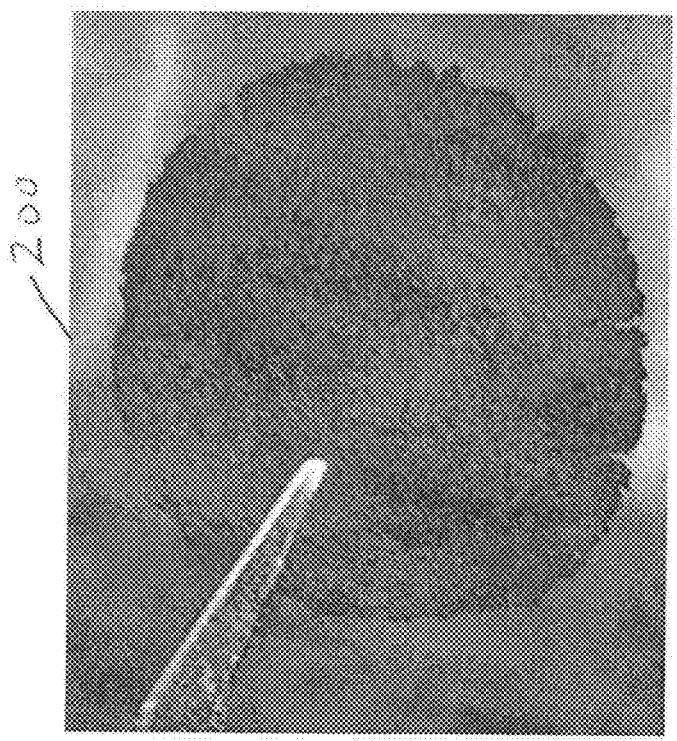
FIG. 2A illustrates a free-standing CNT membrane lifted off a compression plate in accordance with some embodiments of the invention.

FIG. 2A illustrates a free-standing CNT membrane 200 lifted off a compression plate in accordance with some embodiments of the invention. This image demonstrates the mechanical and structural stability of the CNT membrane produced using the above described method of FIG. 1A. Using larger quantities of MWNT/solvent slurry, larger areas of CNT membrane can be manufactured with similar mechanical and structure stability. For example, FIG. 2B illustrates a 20 cm×16 cm CNT membrane 225 manufactured by scaling up a quantity of MWNT/solvent slurry in accordance with some embodiments of the invention. In some embodiments of the invention, CNT membranes obtained from this technique can include uniform thickness and a robust structure with an average density of about 0.42 g/cc, which is close to density of CNT membranes fabricated by other techniques such as vacuum filtration.

In some embodiments, qualitative analysis of CNT membranes made using the method shown in FIG. 1A and described above method was performed using a JEOL XL-30 scanning electron microscope ("SEM"). The morphology and surface quality of the CNT membranes was analyzed from SEM scans starting with low magnification, and progressing to higher magnification levels. SEM micrographs of CNT membrane cross-sections were obtained at different locations along the width to determine the degree of uniformity in thickness. For example, FIG. 3A illustrates SEM micrograph 300 of a CNT membrane at 15000× magnification showing inter-bundle and intra-bundle pores in accordance with some embodiments of the invention.

Figure 3B:
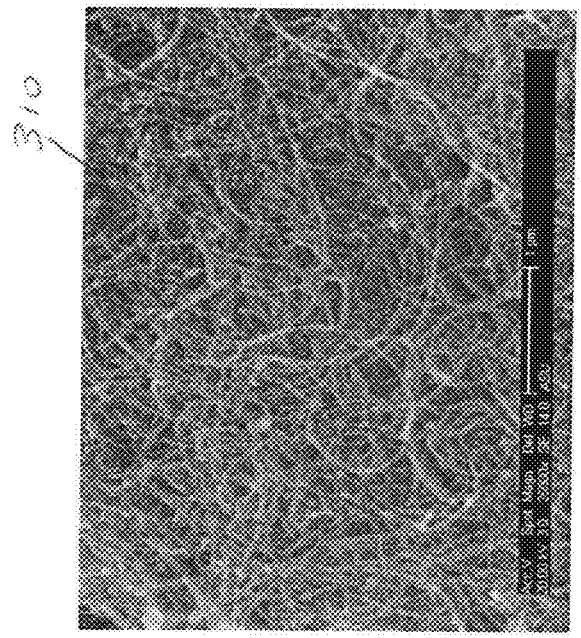
FIG. 3B illustrates a SEM micrograph of a CNT membrane at 25000× magnification showing inter-bundle and intra-bundle pores in accordance with some embodiments of the invention.
Figure 3A:
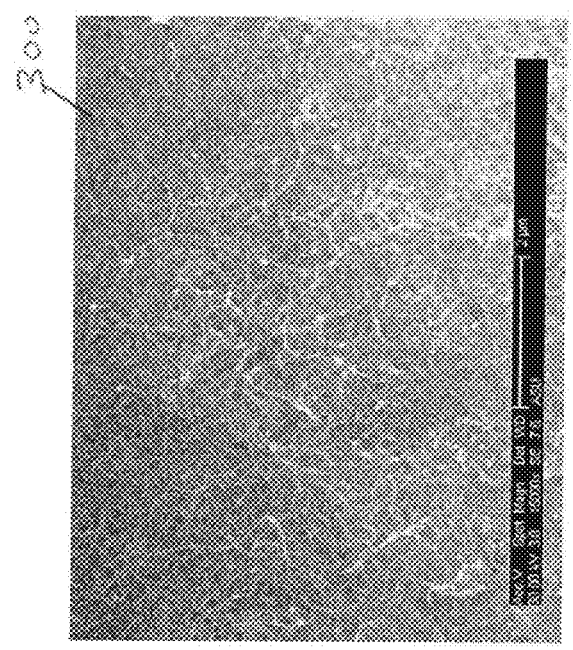
FIG. 3A illustrates a SEM micrograph of a CNT membrane at 15000× magnification showing inter-bundle and intra-bundle pores in accordance with some embodiments of the invention.
Figure 3C:
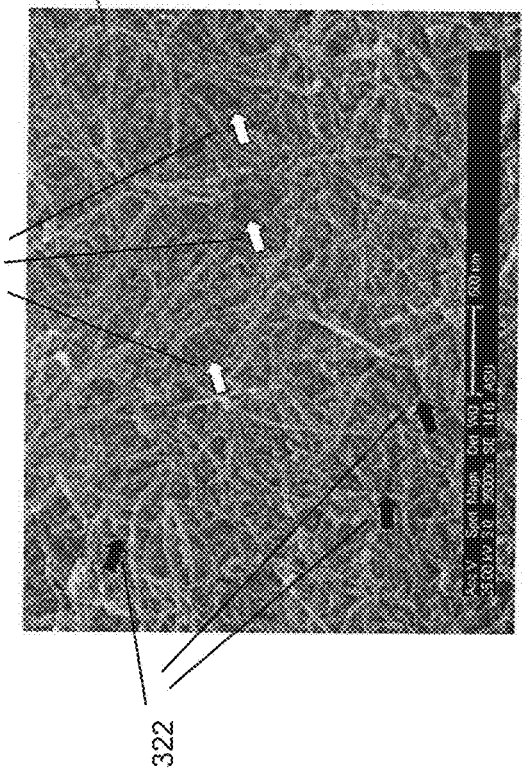
FIG. 3C illustrates a SEM micrograph of a CNT membrane at 35000× magnification showing inter-bundle and intra-bundle pores in accordance with some embodiments of the invention.

Further, FIG. 3B illustrates a SEM micrograph 310 of a CNT membrane at 25000× magnification showing inter-bundle and intra-bundle pores, and FIG. 3C illustrates an SEM micrograph 320 of a CNT membrane at 35000× magnification showing inter-bundle and intra-bundle pores in accordance with some embodiments of the invention. As shown by the images of FIGS. 2A and 2B, and the SEM images of FIGS. 3A-3B, in some embodiments, the CNT membrane manufacturing process can produce substantially uniform, and substantially crack free, mechanically stable structures composed of highly entangled MWNTs. The uniformly distributed and randomly oriented MWNT bundles and the absence of large voids tends to suggest homogeneity in microstructure and isotropic material properties. In some embodiments, two types of pores can be produced (marked with arrows 322 and arrows 324 in FIG. 3C). In some embodiments, a first type can comprise an intra-bundle pores (marked with arrows 322) present within a CNT bundle. In some further embodiments, a second type can be an inter-bundle pores (marked with arrows 324) present between at least two or more CNT bundles.

Figure 4:
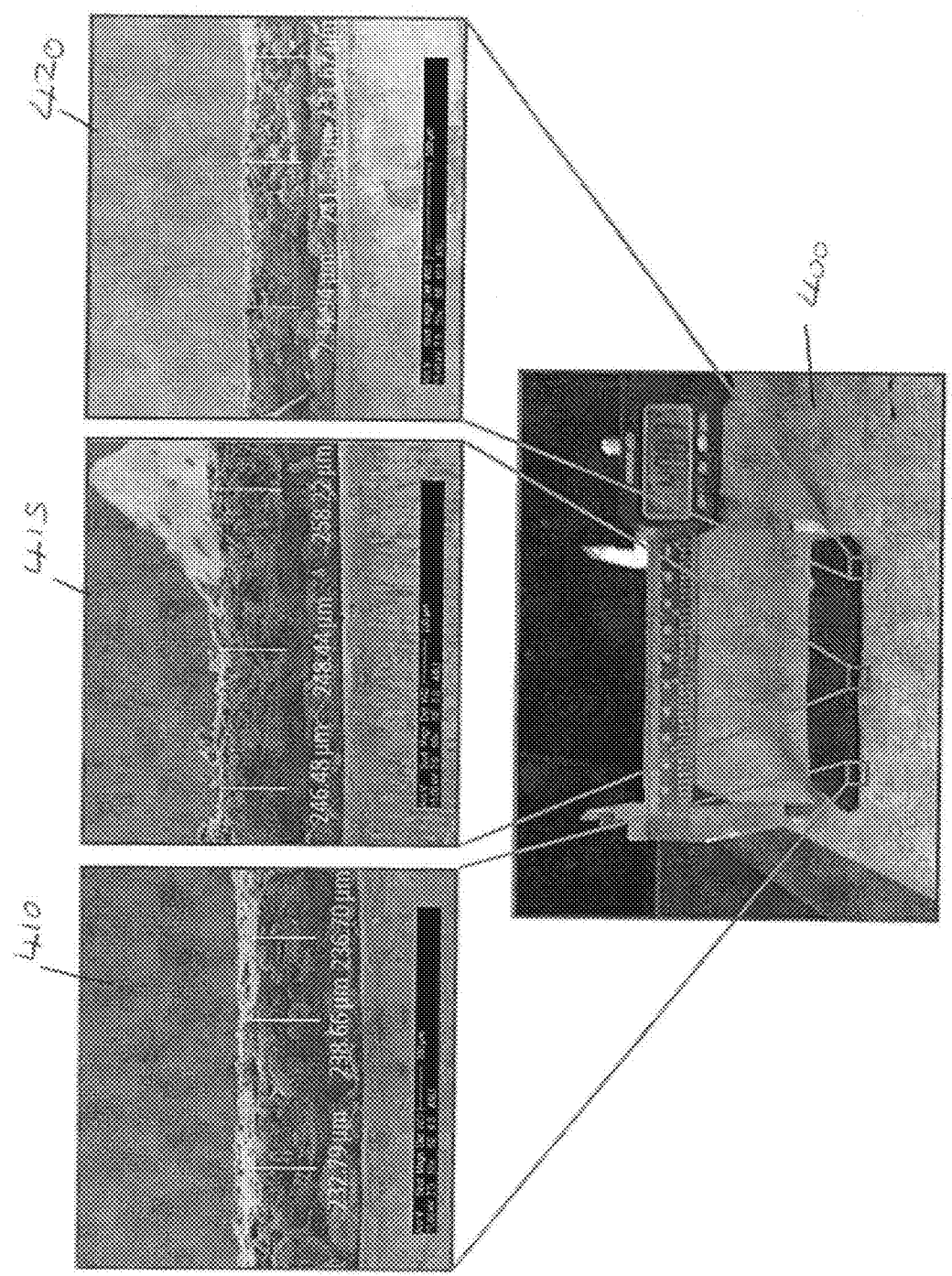
FIG. 4 illustrates uniformity in thickness across the width of a 4 inch wide CNT membrane specimen in accordance with some embodiments of the invention.

FIG. 4 illustrates uniformity in thickness across the width of a 4 inch wide CNT membrane specimen (shown in image 400 with inset images 410, 415, 420 of regions of the cross-section) in accordance with some embodiments of the invention. In some embodiments, the average and standard deviation of thickness of a membrane produced by the CNT membrane manufacturing process shown in FIG. 4 can be about 242.06 μm and about 7.86 μm, respectively.

The DC electrical resistance of CNT membrane produced by the CNT membrane manufacturing process of FIG. 1A was measured at room temperature with a digital multimeter (Fluke 189). The DC conductivity (σ) of CNT membranes and CNT membrane/epoxy films were calculated at room temperature from the following relation:

$$\sigma = \frac{L}{AR}$$

where L is the effective length of specimen between electrodes, A is its cross-sectional area, and R is the measured DC resistance value from the multimeter.

The average electrical conductivity of CNT membranes produced by the CNT membrane manufacturing process was found to be about $13.228 \times 10^3$ S/m. After being impregnated with epoxy to form the nanocomposite films (using the process depicted in FIG. 1B) the conductivity value dropped to $2.124 \times 10^{-4}$ S/m.

Nitrogen adsorption-desorption isotherms were collected at 77K using a Micrometrics Tristar II 3020 surface area and porosity analyzer. The specific surface area (SSA) was obtained by BET technique whereas the pore-size distribution and cumulative pore content were obtained by the Barrett-Joyner-Halenda ("BJH") method. The BET SSA as obtained from $N_2$ adsorption isotherms of six different samples of CNT membrane produced by the CNT membrane manufacturing process was found to be in the range of about 94.62 to about 107.20 m²/g, with the average value of about 102.60 m²/g. The BET SSA of the MWNTs is about 200 m²/g. The SSA value for CNT membrane membranes produced by the CNT membrane manufacturing process is high considering the SSA of MWNTs was 200 m²/g. A high SSA is suitable for a variety of applications such as fuel cell electrodes, gas/vapor sensing, catalyst, water purification and high weight fraction nanocomposites.

Figure 5:
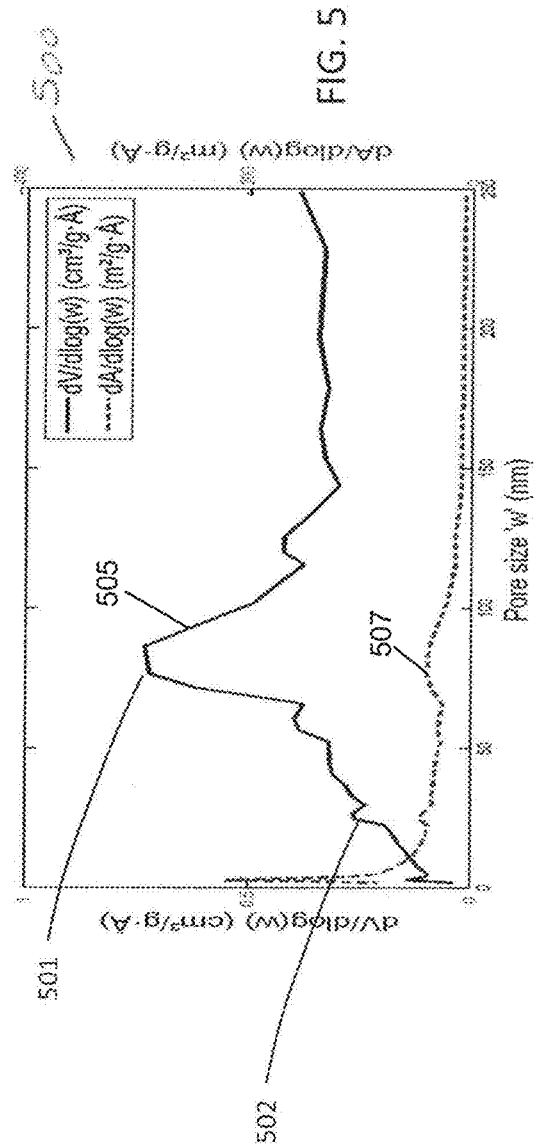
FIG. 5 illustrates pore size distribution as derivative plot of pore volume with respect to pore width versus pore width, and surface area distribution as derivative plot of surface area with respect to pore width versus pore width in accordance with some embodiments of the invention.

The graph 500 of FIG. 5 illustrates pore size distribution as derivative plot of pore volume with respect to pore width versus pore width, and surface area distribution as derivative plot of surface area with respect to pore width versus pore width in accordance with some embodiments of the invention. As shown, the pore size distribution obtained from BJH analysis for the CNT membrane specimen with maximum SSA of about 107.20 m²/g enables comparison of the relative pore volumes between pore size range as the apparent area under the curve is directly proportional to the real volume being occupied by pores in that size range. The plot of dV/dlog(W) versus W (shown as the solid line 505) reveals that pores ranging from about 70 nm to about 120 nm in size occupy relatively larger volume than the micro-size pores (about 1.7 nm to about 4 nm), meso-size pores (about 10 nm to about 40 nm), and large macropores (about 120 nm to about 250 nm). The peak 501 observed in the size range of about 70 nm to about 120 nm represents pores between CNT bundles (i.e., inter-bundle pores). The very local sharp peak 502 corresponding to pore size range of about 20 nm to about 30 nm can be associated with the presence of intra-bundle pores since these pores generally have dimensions close to average CNT diameter. Further, a set of micropores at about 1.7 nm to about 4 nm can be observed in pore volume plots due to inter-tube channels between adjacent MWNTs and smaller intra-bundle pores. Further, SSA distribution as a function of pore width is also presented in FIG. 5. It can be seen from this plot (dotted line 507) that while the pore volumes are mainly associated with mid-sized macropores, the SSA is dominated by micropores (inter tube channels and smaller intra-bundle pores) of width of about 1.7 nm to about 4 nm providing an indication of their higher concentration. The total porosity (φ) was calculated from relation:

$$\Phi = 1 - \rho_{bp}/\rho_{cnt}$$

where $\rho_{bp}$ is the bulk density of CNT membrane and $\rho_{cnt}$ is the density of MWNTs (about 2.1 g/cc). The total porosity was in the range of about 76.3% and about 84.4% with an average value of about 81%.

Some further embodiments of the invention include compositions and methods of fabrication, and methods of use of glass fiber reinforced polymer self-sensing (hereinafter "GFRP") hybrid composites. In some embodiments, the GFRP composites can be self-sensing. Eight harness satin ("8HS") weave of S2 glass fiber from Fibre Glast Development Corporation, 385 Can Drive, Brookville, Ohio 45309, and FS-A23 Part A resin with FS-B412 hardener (also available from Fibre Glast Development Corporation) with a 100/27 weight ratio was used to fabricate self-sensing GFRP laminates using a wet layup method (such as the method shown in FIG. 1B). A CNT membrane was embedded in the center layer (between the $3^{rd}$ and the $4^{th}$ lamina), spanning the gauge length, while laying up the laminate. The six layer composite laminates were cured at room temperature for about 7 days. The laminate was cut into about 8 inch by about 1 inch strips for tensile tests. Tensile tests were conducted on both types of GFRP specimens at a constant displacement rate of about 0.5 mm/min on an MTS Bionix servo-hydraulic test system. Under monotonic tensile loading, the piezo-resistive response of CNT membrane embedded GFRP laminates was recorded using a Fluke 289 multimeter with a data logging feature, and the strain fields on the specimen surface were analyzed using a Digital Image Correlation (DIC) Aramis 5M system. Sensitivity, also known as gauge factor of the CNT membrane sensors was calculated from the relation:

$$GF = \left(\frac{R - R_o}{R_o}\right)\left(\frac{1}{\varepsilon}\right)$$

where R is the electrical resistance at strained state, $R_o$ is the original resistance and ε is the longitudinal strain increment.

Figures 6A, 6B, 6C:
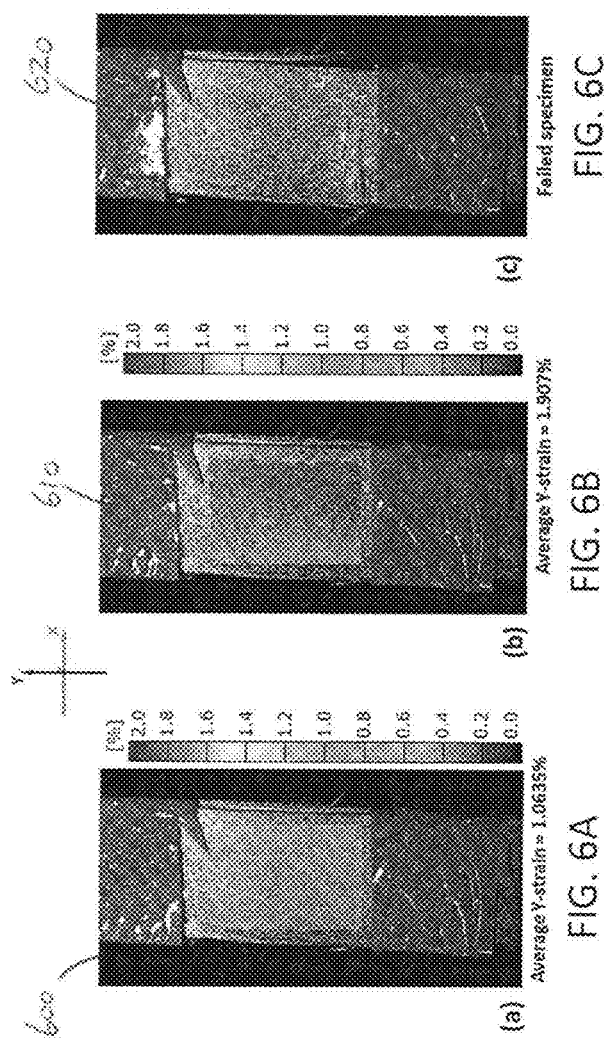
FIG. 6A illustrates uniform strain distribution in CNT membrane embedded region of the composite laminate until 1% strain in accordance with some embodiments of the invention.
FIG. 6B illustrates strain distribution in CNT membrane embedded region of the composite laminate just before failure in accordance with some embodiments of the invention.
FIG. 6C illustrates the failed specimen of CNT membrane embedded composite laminate after tensile test accordance with some embodiments of the invention.

Strain distribution in the CNT membrane embedded region of the GFRP specimens, obtained from DIC is illustrated in FIGS. 6A-6B (shown in images 600, 610) according to some embodiments. Further, image 620 of FIG. 6C illustrates a failed specimen of CNT membrane embedded GFRP after the tensile test in accordance with some embodiments of the invention. Strains along the loading axis are shown at an intermediate and failure stages at FIGS. 6A and 6B respectively. Reasonably uniform strain distribution was observed until about 1% average strain and the sensor data directly correlates with the average global strain until this point. At average strain values above 1%, the strain distribution starts to become non-uniform, and sensor data cannot be considered to represent average strain in the region between electrodes.

Figure 7A:
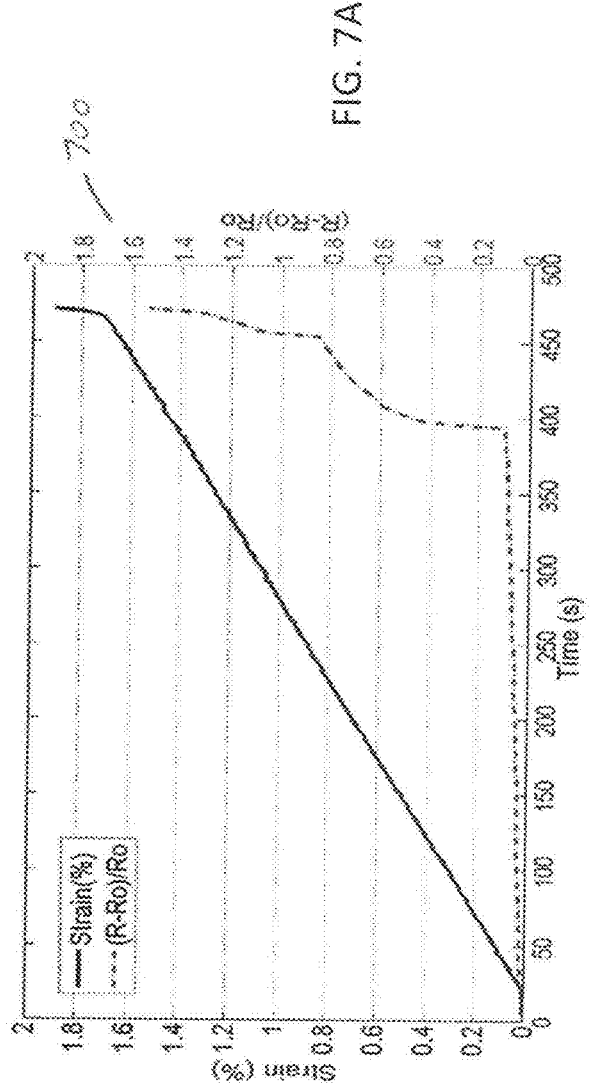
FIG. 7A illustrates the piezoresistive response of the CNT membrane embedded GFRP until failure in accordance with some embodiments of the invention.
Figure 7B:
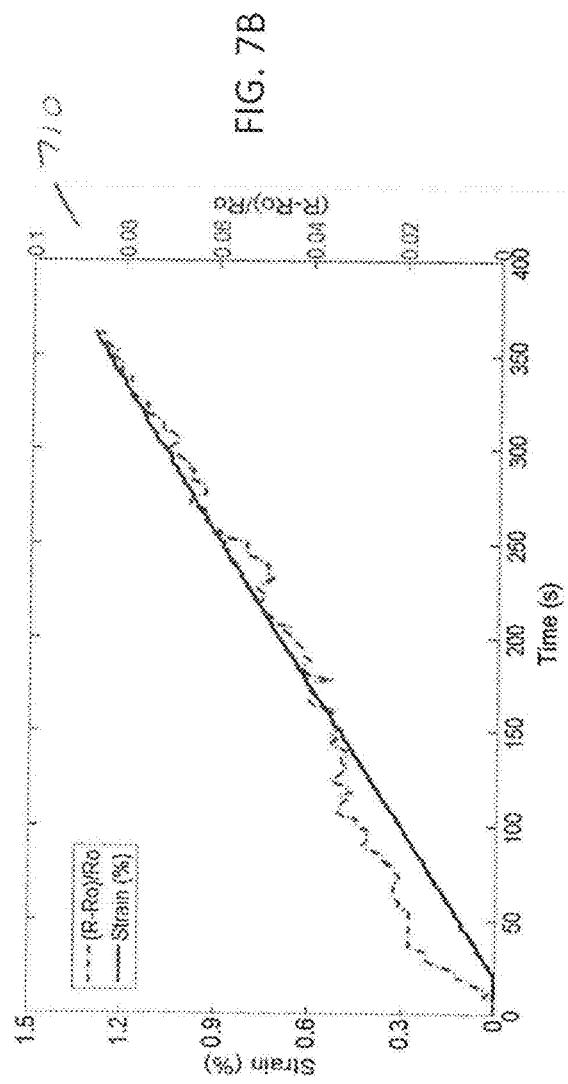
FIG. 7B illustrates piezoresistive response of the CNT membrane embedded GFRP until 1.3% strain showing stable sensitivity in accordance with some embodiments of the invention.

The piezoresistive response of the CNT membrane embedded GFRP strips under tensile loading is presented in plots 700, 710 of FIGS. 7A and 7B. For example, FIG. 7A shows the normalized resistance change as the strain evolves until failure, and FIG. 7B shows stable sensitivity of the embedded CNT membrane up to 1.3% strain. The average sensitivity of five self-sensing GFRP specimens as calculated by a linear fit between about 0.2% to about 0.6% strain was found to be 4.21. This is significantly higher than sensitivity values reported in literature for many conventionally produced carbon nanotube based sensors.

Figure 7C:
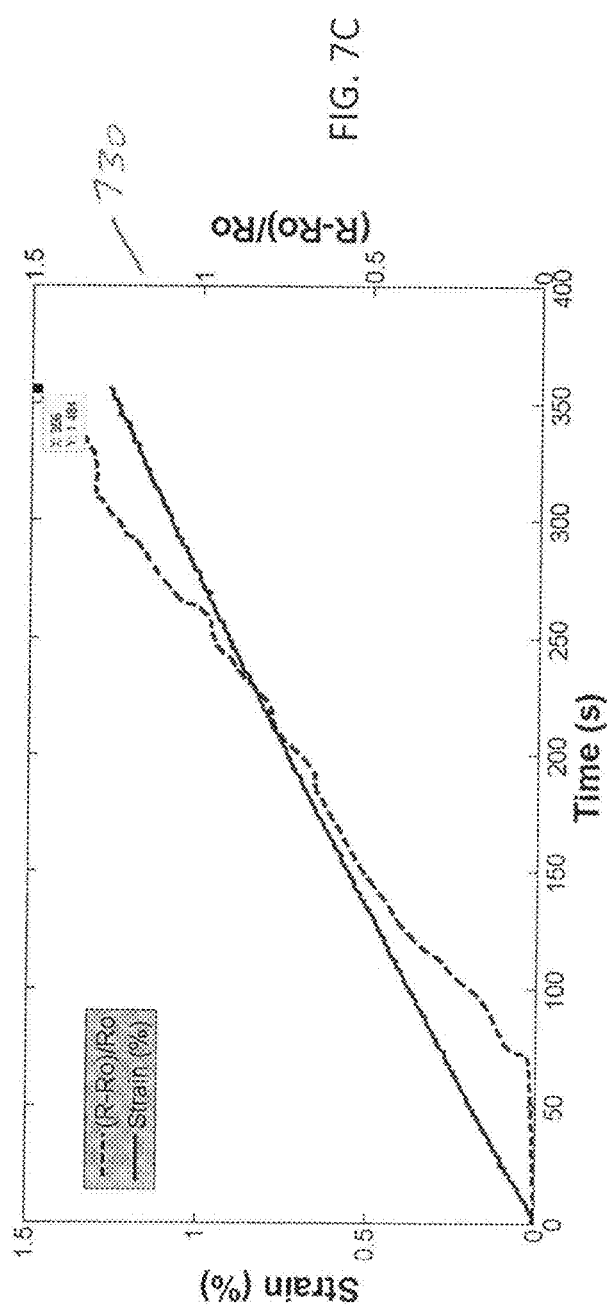
FIG. 7C illustrates a piezo-resistive response of a CNT membrane sensor mounted on GFRP in accordance with some embodiments of the invention.
Figure 7D:
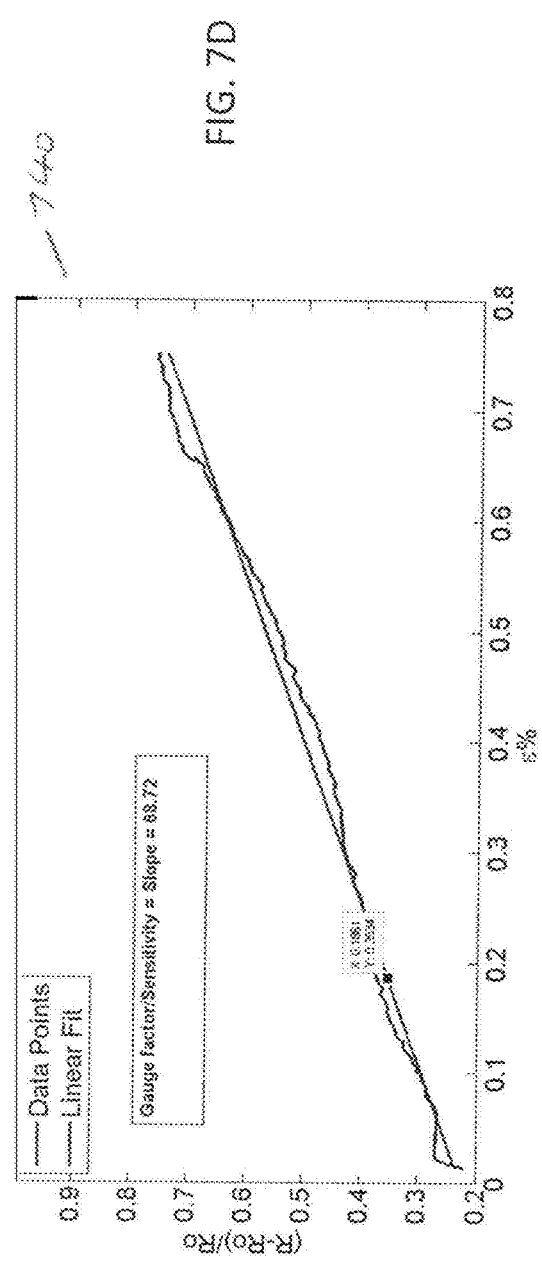
FIG. 7D illustrates a sensitivity/gauge factor analysis of the data plotted in FIG. 7C in accordance with some embodiments of the invention.

In some further embodiments, a CNT membrane was applied to the surface of the GFRP specimen using cyanoacrylate super glue obtained from Stewart-MacDonald, P.O. Box 900, Athens, Ohio 45701, USA, rather than being embedded in the center layer. The plot 730 of FIG. 7C illustrates a piezo-resistive response of CNT membrane sensor mounted on GFRP in accordance with some embodiments of the invention, and the plot 740 of FIG. 7D illustrates a sensitivity/gauge factor analysis of the data plotted in FIG. 7C in accordance with some embodiments of the invention. As illustrated, the strain response of the surface mounted CNT membrane sensor was stable and continuous till failure of glass-fiber laminate. In some embodiments, these structures exhibited about a twenty times greater sensitivity than the above described embedded GFRP specimens, and about forty times higher sensitivity than commercially available strain gauges, and much higher than most conventional CNT sensors. From results calculated in FIG. 7D, showing the sensitivity/gauge factor analysis, for a strain of 0.2% to 0.6%, the gauge factor was 70.2, and for a strain of 0.6% to 1.2%, the gauge factor was 100.6.

Figure 8:
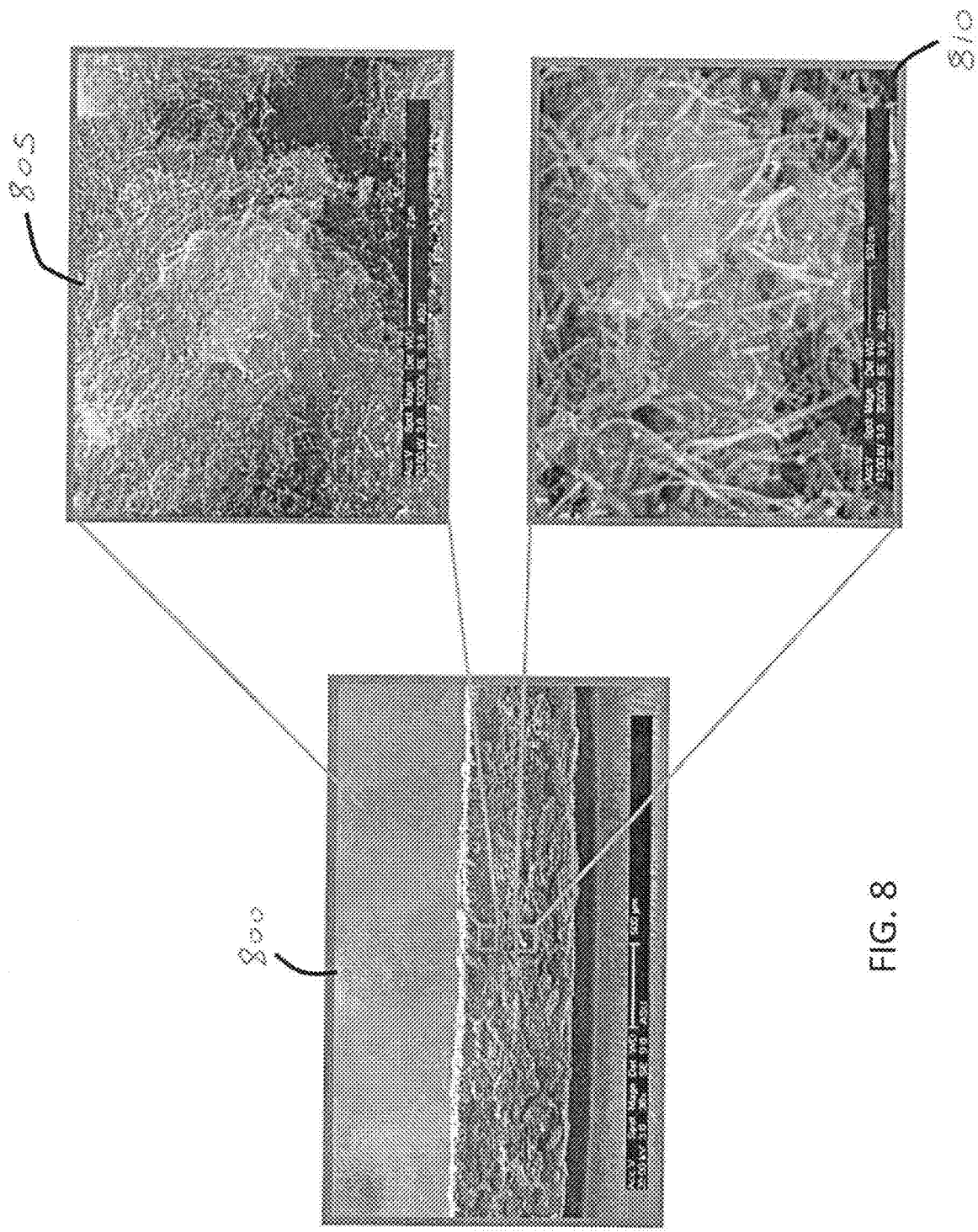
FIG. 8 illustrates the evaluation of through-thickness resin impregnation quality using SEM in accordance with some embodiments of the invention.

FIG. 8 illustrates the evaluation of through-thickness resin impregnation quality using SEM in accordance with some embodiments of the invention. For example, during an analysis of a cross-section 810 of a CNT membrane/epoxy film produced by the above-described methods, areas for analysis were picked from the low magnification cross-sectional image (38x, shown as image 800) and are represented by boxes. High magnification SEM images at different depths from the top (image 805 and image 810) surface reveal substantially full penetration of the resin through the thickness of the CNT membrane and good impregnation quality.

Figure 9:
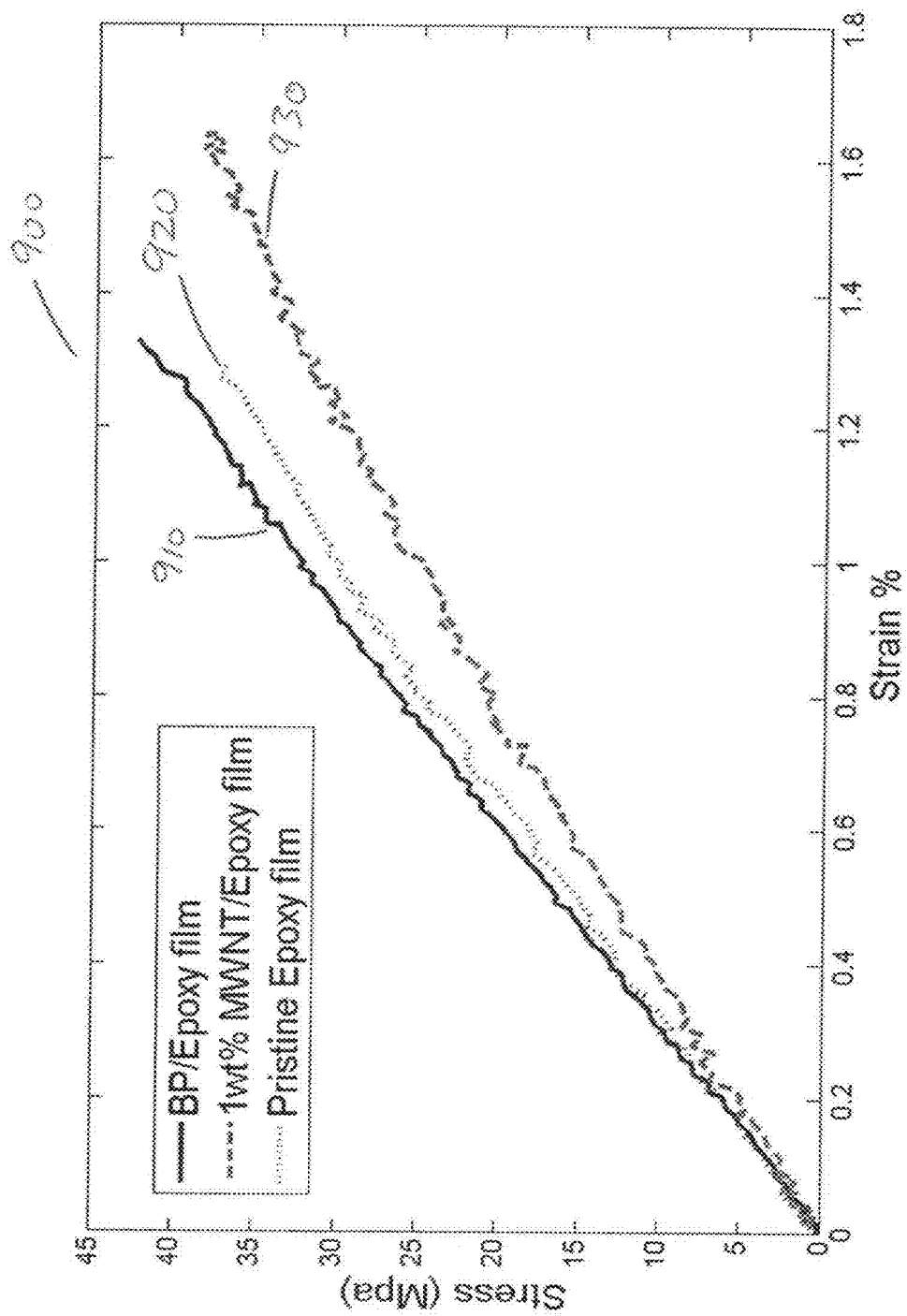
FIG. 9 illustrates stress-strain curves of polymer films with 0, 1, and 30 wt % MWNTs in accordance with some embodiments of the invention.

The stress-strain response of the films under tensile loading was analyzed in order to better understand the interfacial interaction/adhesion between epoxy resin and the embedded CNTs. For example, the plot 900 of FIG. 9 illustrates stress-strain curves of polymer films with no MWNT's (line 920), 1 wt % MWNT (line 930), and 30 wt % MWNTs (line 910) in accordance with some embodiments of the invention. Further, the corresponding average mechanical properties are presented in Table 1 below, showing mechanical properties of pristine, 1 wt % MWNT, and CNT membrane epoxy films.

TABLE 1

Mechanical properties of pristine, 1 wt % MWNT and CNT membrane epoxy films

| Specimen Description | Wt % of MWNTs | Young's Modulus | Tensile strength |
|---|---|---|---|
| Neat Epoxy film | 0 | 3.01 Gpa | 37.08 |
| MWNT/Epoxy film | 1 | 2.72 Gpa | 38.60 |
| Buckypaper/Epoxy film | 30 | 3.66 Gpa | 45.42 |

Strains obtained from DIC were used to plot the stress strain curves in order to analyze mechanical properties accurately. In some embodiments of the invention, CNT membrane epoxy films exhibited 20% greater Young's modulus when compared to pristine epoxy films (i.e., those without the presence of CNT membrane produced by the methods described herein). In some embodiments, this can be attributed to good resin penetration and strong interfacial interaction between resin and CNTs of the reinforcing CNT membrane. Moreover, the higher Young's modulus indicates that effective stress transfer takes place between epoxy matrix and CNT membrane. In some embodiments, the average tensile strength in the case of CNT membrane epoxy films was found to be about 17% greater than pristine epoxy films suggesting homogeneous and consistent microstructure of CNT membrane and good interfacial adhesion between constituent CNTs and resin. In some embodiments, the lower modulus in the case of randomly dispersed 1 wt % MWNT films can be attributed to non-homogeneous distribution of MWNTs, and formation of agglomerations since the use of surfactants and surface functionalization was avoided during the dispersion phase. In some embodiments, regions with agglomerated MWNTs may lack resin and this can lead to decrease in elastic modulus of the films.

In some embodiments, self-sensing glass fiber epoxy laminates (hereinafter "GFRPs") were fabricated using six layers of eight harness satin (8HS) weave of S2 glass fiber from Fibre Glast and Epon 863 with hardener EPI-CURE 3290 with a 100/27 weight ratio. Other embodiments can be fabricated using more or less than six layers. Using a wet layup procedure, a CNT membrane extending the gauge length of the sample or specimen was embedded in a center layer (i.e., between the third and fourth layers of glass fiber) of the laminate. In some embodiments, silver adhesive tracks were painted on to the CNT membrane surface (hereinafter referred to as "SGFRP") prior to embedding in order to avoid the use of invasive electrodes. Other conventional conductor materials can be used in place of silver. In some embodiments, this structure can result in high conductivity in the glass fiber epoxy laminates since the contact resistance at the electrode-membrane interface is minimized. Following the wet layup procedure, the specimens were cured in a hot press. The laminates were cut into 8 inch×1 inch strips for mechanical and piezoresistive characterization. In order to analyze the piezoresistive response of the SGFRP under cyclic tensile loading, specimens were mounted on a MTS Bionix servo-hydraulic test frame and the load was applied under displacement control mode, with a strain range of about 0.002 to about 0.009 at a rate of about 0.5 mm/min. The changes in the electrical resistance of the embedded CNT membrane were recorded in real-time using a digital multimeter (Fluke 289) with a data logging feature.

Figure 10:
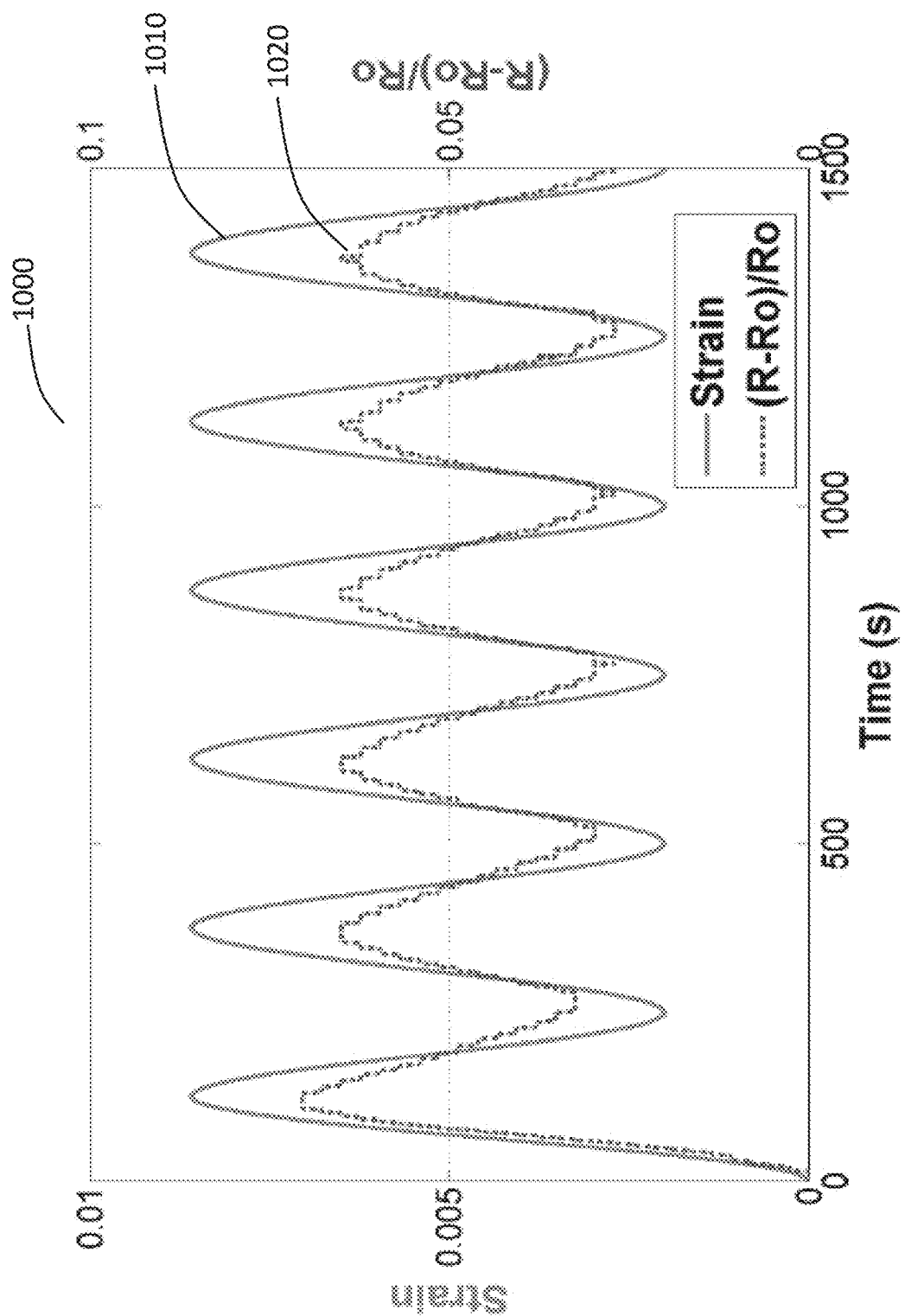
FIG. 10 shows piezoresistive response of self-sensing glass fiber epoxy laminates in accordance with some embodiments of the invention.

The plot 1000 of FIG. 10 shows piezoresistive response of self-sensing glass fiber epoxy laminates. In this plot, (R–Ro)/R (1020) is the normalized change in electrical resistance of the embedded CNT membrane. The SGFRP specimens showed stable and repeatable piezoresistive response under cyclic loading. The electrical resistance change in the embedded CNT membrane as cyclic strain was applied is illustrated (data line 1010). In some embodiments, the gauge factor was found to be higher for the first loading cycle (9.34 for ascending and 5.08 for descending) as compared to the subsequent loading cycles, retaining a stable sensitivity over the next five cycles with an average value of 5.62 for ascending and 4.17 for descending segments of the cycles. Delamination was observed in the CNT membrane layer of the composite after 80,000 cycles indicating the end of the functional life of the embedded sensor. The fatigue tests were stopped after 210,000 cycles and complete failure of the specimen was not observed. However, consistent load drop after 100,000 cycles indicates cyclic softening in the polymer matrix.

Figure 11:
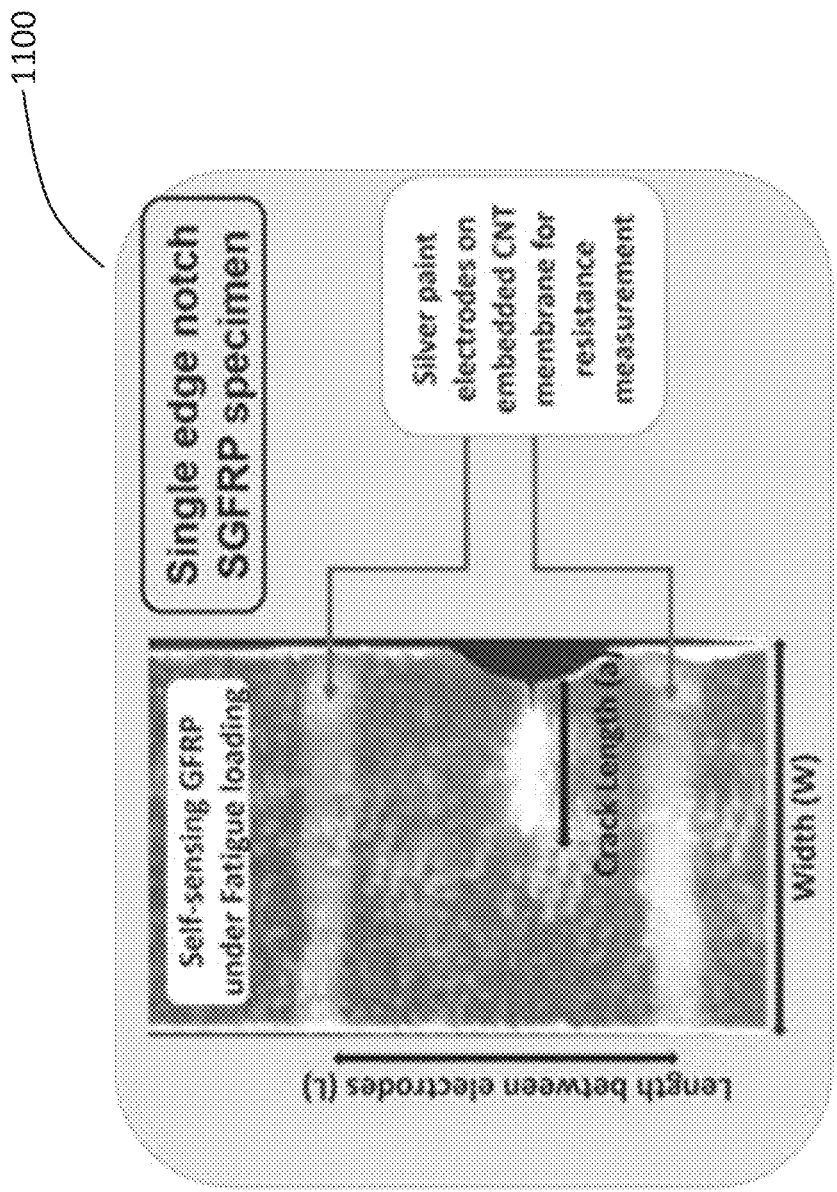
FIG. 11 shows a SGFRP specimen used in a measurement model for in-situ crack length detection and quantification in accordance with some embodiments of the invention.

FIG. 11 shows a SGFRP specimen used in a measurement model for in-situ crack length detection and quantification in accordance with some embodiments of the invention. The measurement model was developed to correlate the growing fatigue crack length at any instant to the change in electrical resistance of the embedded CNT membrane in the SGFRP laminate. A semicircular single edge notch was made on the specimens as shown in FIG. 11, and the specimens were subjected to displacement controlled tension-tension fatigue with strain range of about 0.002 to 0.0065, with a frequency of about 5 Hz, and the load ratio was about 0.2. The electrical resistance readings were obtained at regular intervals during the fatigue test. Since the loading was uniaxial, the fatigue crack grows along a straight line, approximately perpendicular to the loading axis. In some embodiments, this can lead to a reduction in the effective conducting width of the embedded CNT membrane as the crack length increases. The measurement model is derived from the resistivity equation and is given as, $$R = \frac{\rho L}{t(w - a)} \quad (1)$$

where R is the measured electrical resistance of the specimen at any instant during the fatigue test, L is the length of embedded CNT membrane (measured between the silver painted electrodes), and t, w and ρ are the thickness, width, and electrical resistivity of the membrane respectively. The crack length at any instant as calculated from equation (1) is given by 'a'.

Figure 12A:
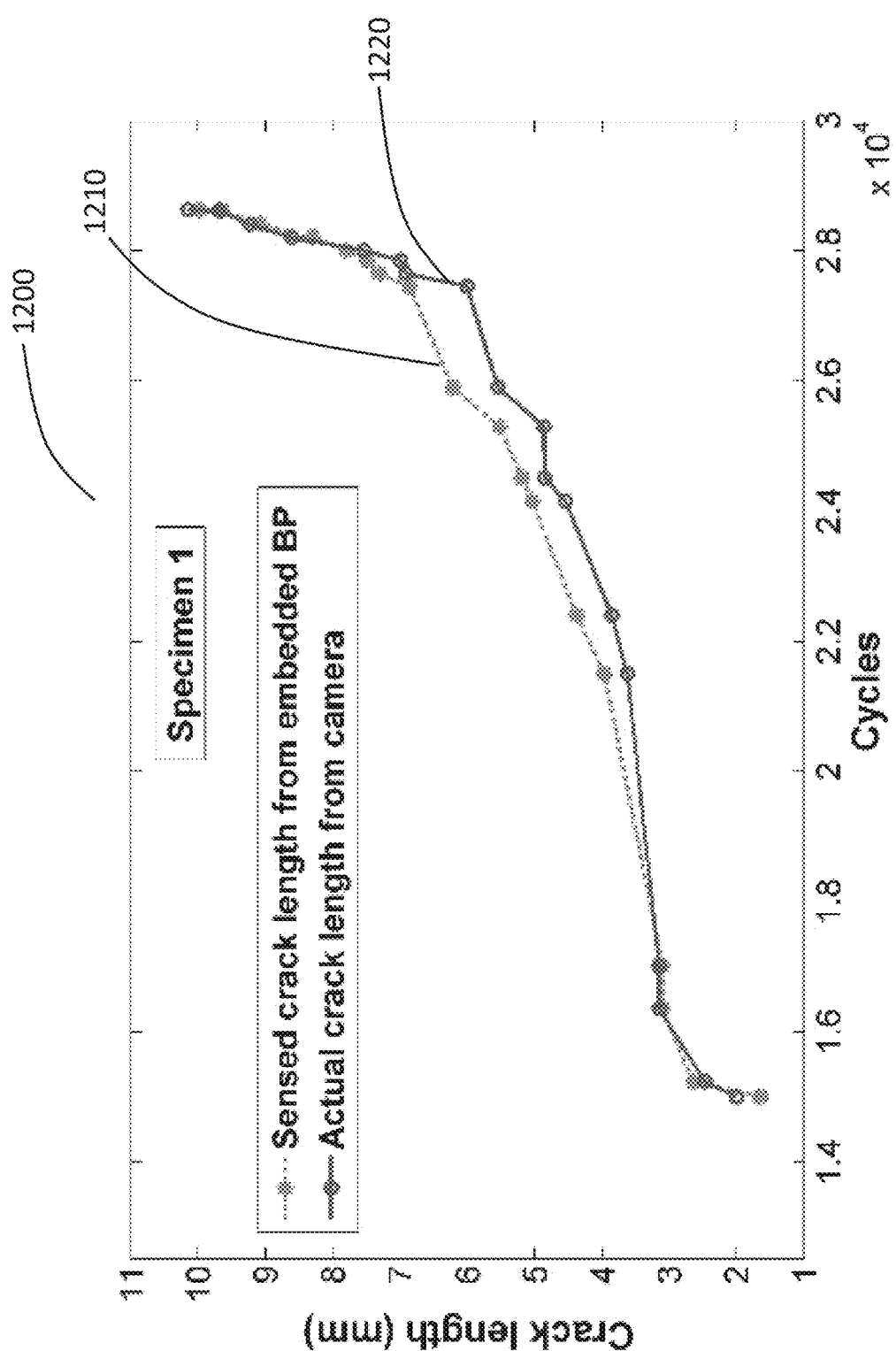
FIGS. 12A-12C show plots of actual crack lengths and sensed crack lengths as a function of fatigue cycles for three specimens in accordance with some embodiments of the invention.
Figure 12B:
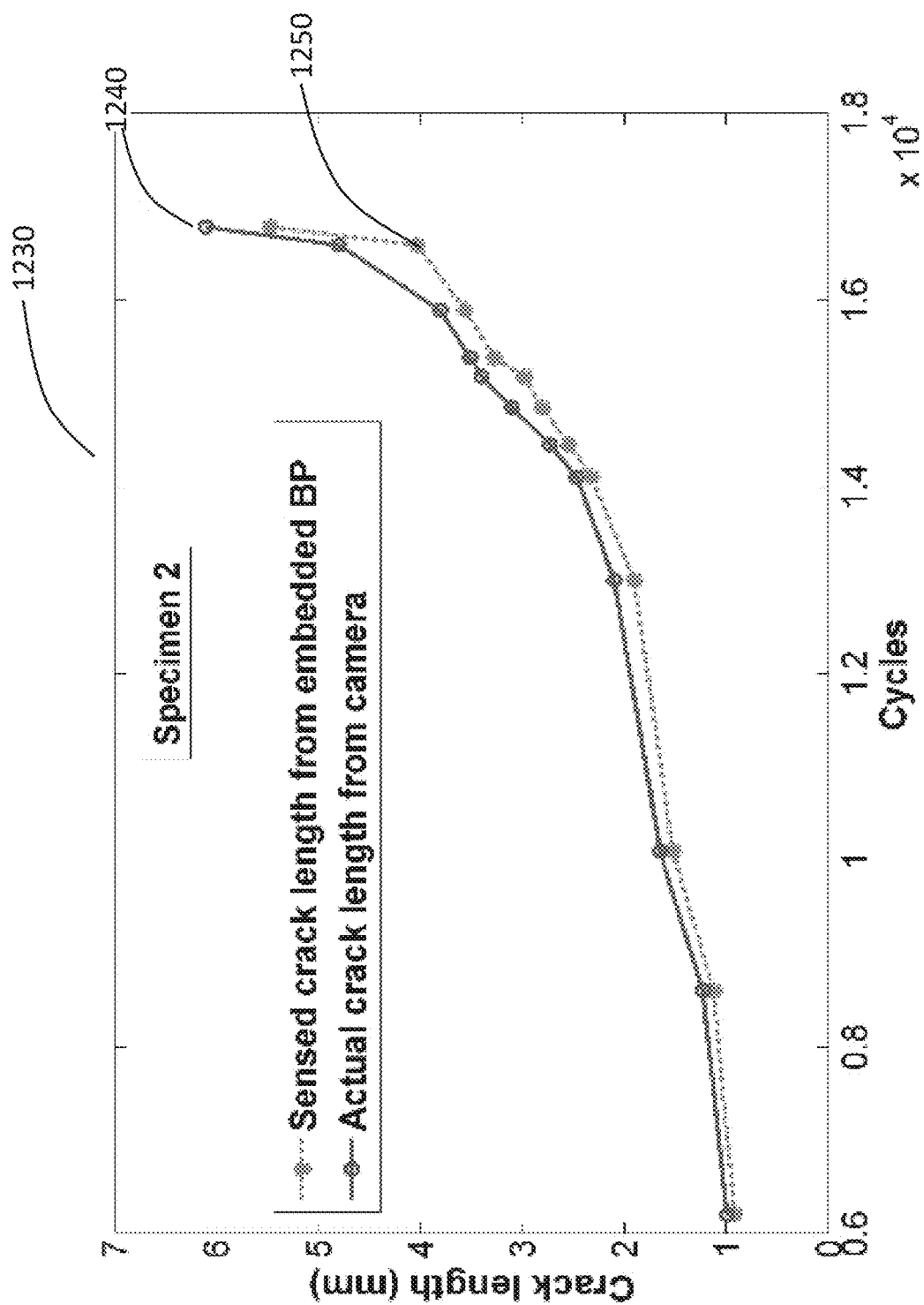
Figure 12C:
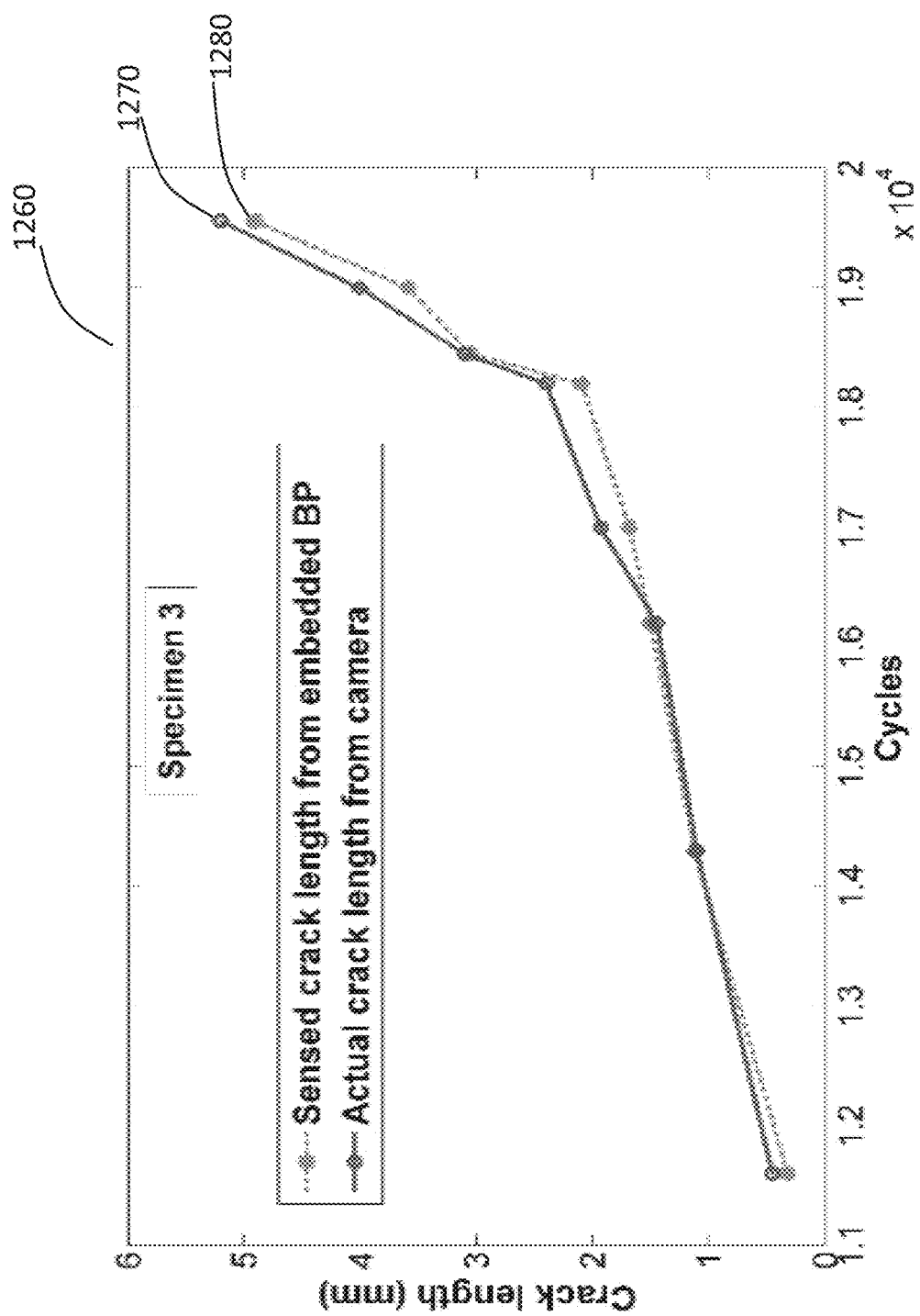

FIGS. 12A-12C show plots of actual crack lengths and sensed crack lengths as a function of fatigue cycles for three specimens in accordance with some embodiments of the invention. The FIGS. 12A-12C show the comparison between crack lengths sensed in SGFRPs from in-situ electrical resistance measurements and actual crack lengths which were obtained from high resolution camera. For example, plot 1200 of FIG. 12A shows data actual crack length 1220 and sensed crack length 1210. Further, plot 1230 of FIG. 12A shows data actual crack length 1260 and sensed crack length 1250, and plot 1260 of FIG. 12A shows data actual crack length 1270 and sensed crack length 1280. The experimental results shown in FIGS. 12A-12C indicate significantly high accuracy of the proposed real-time crack length sensing methodology. The crack lengths obtained from the measurement model in real-time showed close agreement with the actual crack length values obtained from the high resolution camera.

FIG. 13A illustrates fatigue crack propagation in silver electrode glass fiber epoxy laminates specimen in accordance with some embodiments of the invention, and FIG. 13B illustrates fatigue crack propagation in a baseline glass fiber epoxy laminate specimen in accordance with some embodiments of the invention. The series of images obtained for the SGRFP specimens at progressive stages of the fatigue test and are presented in FIG. 13A, where the trend in crack propagation is representative of six specimens tested under the same fatigue loading. The average crack growth rate from six specimens was found to be 5.36×10-4 mm/cycle over the stable crack propagation regime (between crack initiation and fast fracture regime). In comparison, the average crack growth rate in baseline GFRP specimens for the stable crack propagation regime was found to be 1.53× 10-3 mm/cycle, which is significantly higher than SGFRPs. In some embodiments, the order of magnitude reduction in the fatigue crack growth rate due to the introduction of buckypaper into the interlaminar region of the GFRP laminates can be explained by the presence of the randomly oriented and densely entangled microstructure of the embedded buckypaper. In some embodiments, this can result in a highly torturous crack path leading to retardation in the fatigue crack growth rate and even crack arrest phenomenon at various instances during crack propagation. As shown in FIG. 13A, the crack path in SGFRPs was highly torturous and crack tip blunting takes place at various stages of the fatigue test. Further, in some embodiments, in the stable crack propagation regime, between the 15000 to 21500 fatigue cycles, it can be seen that the crack tip becomes blunt without significant increase in crack length. FIG. 13B shows fatigue crack propagation trend in one of the baseline GFRP specimens where relatively sharp and defined crack tip can be observed and the trend is representative of six GFRP specimens tested under the same fatigue loading. This observation points to an additional crack deceleration type attribute of the SGFRP.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each publication cited herein is incorporated by reference, as if each publication were individually incorporated by reference herein. Various features and advantages of the invention are set forth in the following claims.

The invention claimed is:
1. A membrane forming method comprising:
preparing a dispersion of at least one solvent and a plurality of carbon nanotubes, wherein the at least one solvent comprises at least one alcohol or acetone, and wherein the dispersion is free of surfactant;

preparing a concentrated slurry from at least a portion of the dispersion by removing at least a portion of the at least one solvent using sonication;

applying at least a portion of the slurry to a first surface; and forming a carbon nanotube membrane by compressing at least a portion of the slurry between the first surface and at least a second surface.

2. The method of claim 1, wherein the at least one solvent comprises at least one alcohol.

3. The method of claim 2, wherein the at least one alcohol comprises methanol, ethanol, isopropyl alcohol, or a combination thereof.

4. The method of claim 1, wherein the at least one solvent comprises acetone.

5. The method of claim 1, wherein the sonication is induced using a tip-sonicator.

6. The method of claim 5, wherein the tip-sonicator operates at a frequency of about 20 KHz.

7. The method of claim 5, wherein the tip-sonicator operates at a power level of about 15 Watts.

8. The method of claim 1, wherein the carbon nanotube membrane is mechanically self-supporting upon removal from at least one of the first surface and the second surface.

9. The method of claim 1, wherein the first surface and the second surface are pressed together at a rate of about 0.2 mm/s.

10. The method of claim 1, wherein the plurality of carbon nanotubes includes at least one of single-wall carbon nanotubes and multi-wall carbon nanotubes.

11. A composite assembly method comprising:
forming a carbon nanotube membrane using a method comprising:
preparing a dispersion of at least one solvent and a plurality of carbon nanotubes, wherein the at least one solvent comprises at least one alcohol or acetone, and wherein the dispersion is free of surfactant;
preparing a concentrated slurry from at least a portion of the dispersion by removing at least a portion of the at least one solvent using sonication;
applying at least a portion of the slurry to a first surface;
forming a carbon nanotube membrane by compressing at least a portion of the slurry between the first surface and at least a second surface; and
sandwiching the carbon nanotube membrane between two or more bleeder cloth layers to form an uncured assembly;
applying at least one curable resin to a first side of the uncured assembly;
applying at least one curable resin to a second side of the uncured assembly; and
forming the composite assembly by curing the uncured assembly.

12. The composite assembly method of claim 11, wherein the sonication is induced using a tip-sonicator.

13. The composite assembly method of claim 11, wherein the carbon nanotube membrane is at least partially dried prior to forming the uncured assembly.

14. The composite assembly method of claim 11, wherein the curable resin at least partially permeates at least a portion of the carbon nanotube membrane.

15. The composite assembly method of claim 11, wherein the curable resin comprises an epoxy-based monomer.

16. The method of claim 1, wherein the concentrated slurry has a concentration of 25 mg/mL or greater.

17. A membrane forming method comprising:
preparing a dispersion consisting of a solvent and a plurality of carbon nanotubes, wherein the solvent is an alcohol, acetone, or a combination thereof;
preparing a slurry from at least a portion of the dispersion by removing at least a portion of the at least one solvent;
applying at least a portion of the slurry to a first surface; and
forming a carbon nanotube membrane by compressing at least a portion of the slurry between the first surface and at least a second surface.

* * * * *